US012716985B2

(12) United States Patent
Uchida et al.

(10) Patent No.: US 12,716,985 B2
(45) Date of Patent: Aug. 25, 2026

(54) GEOLOCATION METHOD FOR DETECTION AND TRACKING OF MANEUVERING EMITTERS

(71) Applicant: Lockheed Martin Corporation, Bethesda, MD (US)

(72) Inventors: Michael Scott Uchida, Highlands Ranch, CO (US); Babak Mokaberi, Lone Tree, CO (US); Attiano Purpura-Pontoniere, Hayward, CA (US); Tarun Bhattacharya, San Jose, CA (US); Marissa Montano, Bethesda, MD (US); Jeremy J. Clark, Colorado Springs, CO (US); Patrick Michael Wolf, San Jose, CA (US)

(73) Assignee: Lockheed Martin Corporation, Bethesda, MD (US)

(*) Notice: Subject to any disclaimer, the term of this patent is extended or adjusted under 35 U.S.C. 154(b) by 258 days.

(21) Appl. No.: 18/672,920

(22) Filed: May 23, 2024

(65) Prior Publication Data

US 2024/0393421 A1 Nov. 28, 2024

Related U.S. Application Data

(60) Provisional application No. 63/503,816, filed on May 23, 2023.

(51) Int. Cl.

| | |
|---|---|
| ***G01S 5/02*** | (2010.01) |
| ***G01S 11/02*** | (2010.01) |
| ***G01S 19/39*** | (2010.01) |

(52) U.S. Cl.

CPC ........ *G01S 5/0249* (2020.05); *G01S 5/02216* (2020.05); *G01S 5/0294* (2013.01); *G01S 11/026* (2013.01); *G01S 19/393* (2019.08)

(58) Field of Classification Search

CPC .. G01S 11/026; G01S 19/393; G01S 2205/07; G01S 5/02216; G01S 5/0244;

(Continued)

(56) References Cited

U.S. PATENT DOCUMENTS

| | | | | |
|---|---|---|---|---|
| 7,508,344 B2 * | 3/2009 | Stroud | G01S 5/12 | 342/387 |
| 7,626,546 B2 * | 12/2009 | Chung | G01S 5/0268 | 342/465 |

(Continued)

*Primary Examiner* — Peter M Bythrow

(74) *Attorney, Agent, or Firm* — Baker Botts L.L.P.

(57) ABSTRACT

A method includes receiving, using radio frequency (RF) collectors, RF signals from a target object. The RF signals of target object may be converted to In-phase and Quadrature (I/Q) data. Navigation data of each RF collector may be determined and I/Q data of each of RF collectors are paired. Processing functions may be applied on paired I/Q data. Using paired I/Q data, one or more of time difference of arrival (TDOA) measurement data and frequency difference of arrival (FDOA) measurement data between each pair of the RF collectors are determined. One or more of TDOA measurement data, FDOA measurement data and navigation data of each RF collector are converted to message data. A trajectory of target object may be estimated based on confidence measure of one or more of TDOA and FDOA measurement data. Using estimated trajectory of target object for displaying on a display device of a computing device.

20 Claims, 12 Drawing Sheets

(58) Field of Classification Search
CPC .... G01S 5/0246; G01S 5/0249; G01S 5/0268; G01S 5/0294; G01S 5/06
See application file for complete search history.

(56) References Cited

U.S. PATENT DOCUMENTS

| | | | | |
|---|---|---|---|---|
| 2006/0240839 | A1* | 10/2006 | Chen | G01S 19/48 455/12.1 |
| 2007/0120738 | A1* | 5/2007 | Stroud | G01S 5/06 342/465 |
| 2010/0315290 | A1* | 12/2010 | Grabbe | G01S 5/12 342/386 |
| 2012/0256789 | A1* | 10/2012 | Bull | G01S 5/02216 342/450 |
| 2016/0299212 | A1* | 10/2016 | Broad | G01S 5/12 |
| 2017/0205492 | A1* | 7/2017 | Jacklin | G01S 5/06 |
| 2019/0208112 | A1* | 7/2019 | Kleinbeck | G01S 5/0221 |
| 2025/0175283 | A1* | 5/2025 | McCarthy et al. | G06N 3/0455 |

* cited by examiner

GEOLOCATION METHOD FOR DETECTION AND TRACKING OF MANEUVERING EMITTERS

BENEFIT CLAIM

This application claims the benefit under 35 U.S.C. § 119 (e) of provisional patent application 63/503,816, filed May 23, 2023, the entire contents of which are hereby incorporated by reference as if fully set forth herein.

TECHNICAL FIELD

This disclosure generally relates to radio frequency (RF) environments and, more particularly, to methods and systems for tracking maneuvering targets emitting RF signals.

BACKGROUND

Traditional systems use collecting platforms that can collect positional and navigation data from emitters. They require at least one of the platforms or emitters to be stationary. Traditional systems do not detect moving data from moving platforms, and they do not have the ability to track or trace highly maneuvering emitters.

DETAILED DESCRIPTION

Overview

Figure 1:
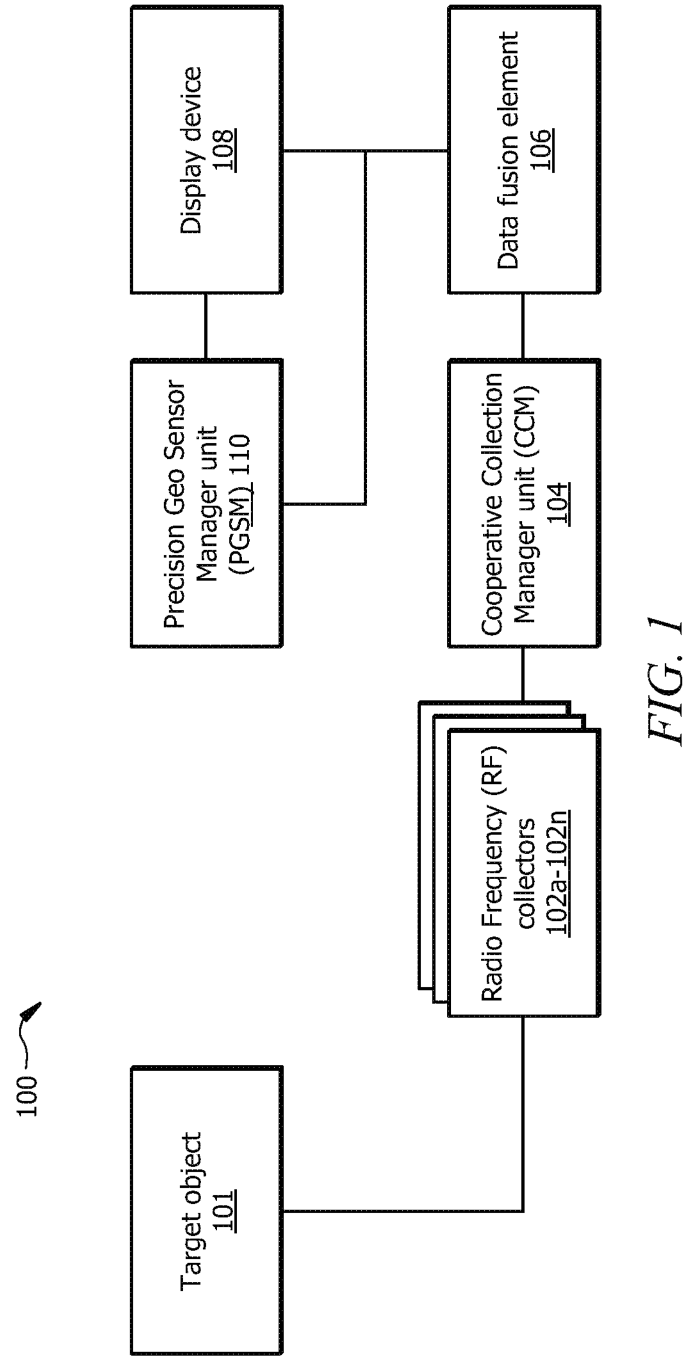
FIG. 1 shows an overview of a distributed network environment, according to particular embodiments.

Embodiments of the present disclosure relate to a computer-implemented method. The method may be performed by a computing system coupled to a computing device. The method includes receiving, using radio frequency (RF) collectors communicatively coupled to the computing system, RF signals from a target object. The method includes converting the RF signals of the target object to In-phase and Quadrature (I/Q) data. The method includes determining navigation data of each RF collector. The I/Q data of each of the RF collectors may be paired. The method includes applying processing functions on the paired I/Q data of the RF collectors. The method includes determining, using the paired I/Q data of the RF collectors, one or more of time difference of arrival (TDOA) measurement data and frequency difference of arrival (FDOA) measurement data between each pair of the RF collectors. The method includes converting the one or more of the TDOA measurement data and the FDOA measurement data between each pair of the RF collectors and the navigation data of each RF collector to message data. The method includes estimating a trajectory of the target object based on a confidence measure of the one or more of the TDOA measurement data and the FDOA measurement data. The method includes using the estimated trajectory of the target object for displaying on a display device associated with the computing device.

Embodiments of the present disclosure relate to a computing system. The computing system includes a memory configured to store registration information of a computing device and a hardware processor communicatively coupled to the memory. The hardware processor may be configured to execute receiving, using radio frequency (RF) collectors communicatively coupled to the computing system, RF signals from a target object. The hardware processor may be configured to execute converting the RF signals of the target object to In-phase and Quadrature (I/Q) data. The hardware processor may be configured to execute determining navigation data of each RF collector. The I/Q data of each of the RF collectors may be paired. The hardware processor may be configured to execute applying processing functions on the paired I/Q data of the RF collectors. The hardware processor may be configured to execute determining, using the paired I/Q data of the RF collectors, one or more of time difference of arrival (TDOA) measurement data and frequency difference of arrival (FDOA) measurement data between each pair of the RF collectors. The hardware processor may be configured to execute converting the one or more of the TDOA measurement data and the FDOA measurement data between each pair of the RF collectors and the navigation data of each RF collector to message data. The hardware processor may be configured to execute estimating a trajectory of the target object based on a confidence measure of the one or more of the TDOA measurement data and the FDOA measurement data. The hardware processor may be configured to execute using the estimated trajectory of the target object for displaying on a display device associated with the computing device.

Embodiments of the present disclosure relate to a non-transitory computer-readable medium storing instructions that, when executed by a processor of a computing system, causes the processor to execute one or more operations. The processor may be configured to execute receiving, using radio frequency (RF) collectors communicatively coupled to the computing system, RF signals from a target object. The processor may be configured to execute converting the RF signals of the target object to In-phase and Quadrature (I/Q) data. The processor may be configured to execute determining navigation data of each RF collector. The I/Q data of each of the RF collectors are paired. The processor may be configured to execute applying processing functions on the paired I/Q data of the RF collectors. The processor may be configured to execute determining, using the paired I/Q data of the RF collectors, one or more of time difference of arrival (TDOA) measurement data and frequency difference of arrival (FDOA) measurement data between each pair of the RF collectors. The processor may be configured to execute converting the one or more of the TDOA measurement data and the FDOA measurement data between each pair of the RF collectors and the navigation data of each RF collector to message data. The processor may be configured to execute estimating a trajectory of the target object based on a confidence measure of the one or more of the TDOA measurement data and the FDOA measurement data. The processor may be configured to execute using the estimated trajectory of the target object for displaying on a display device associated with a computing device.

In an embodiment, the disclosure provides a solution to track any maneuvering target objects. The disclosure provides a high-precision geolocation architecture for tracking any maneuvering targets. In particular, the high-precision geolocation architecture performs real-time passive tracking of maneuvering target objects, that are emitting communication RF signals. For example, the communication RF signals may include low-SINR signals. In an embodiment, the high-precision geolocation architecture includes a number of components to produce a working passive cooperative geolocation system. The high-precision geolocation architecture may be associated with one or more features, which include but are not limited to generation and use of tip and cue to optimize computations, track generation and updates using partial geo-observables, and enable distributed processing support. The high-precision geolocation architecture may be configured to support general purpose-graphics processing units (GP-GPU) processing and be flexible enough to adapt to available resources. In some embodiments, the high-precision geolocation architecture may be configured for porting to different platforms. For example, the high-precision geolocation architecture may have the potential to be used for maneuvering targets from mobile platforms. In an embodiment, the high-precision geolocation architecture may be capable of applying unique ways to use tip and cue information intelligently to reduce computational requirements. Implementing the high-precision geolocation architecture overcomes past efforts to track stationary on-ground targets and the need for custom hardware implementation.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

Embodiments of the present disclosure provide a system, a method, and a non-transitory storage medium that relates to a high-precision geolocation architecture for tracking highly maneuvering targets or non-stationary targets. In particular embodiments, the present disclosure utilizes a computing system to coordinate the receipt of RF data and orchestrate processing by DCAF to detect and track positions and velocity of maneuvering terrestrial or airborne target objects, for example, such as aircraft, vehicles, surface vessels, personal devices, and other maneuvering targets associated with emitting or communicating RF signals. In an embodiment, the maneuvering target object may be transmitting any kind of low signal to interference plus noise ratio (low-SINR) communicating RF signals. In some embodiments, the present disclosure utilizes one or more components which include, but are not limited to, synchronized collection of transmitted RF signals with at least three collectors (stationary or non-stationary receivers) and on-board global positioning system (GPS) equipped devices for detecting and tracking position and velocity of each collector at any given time that may be associated with detecting the target object. In particular, the computing system keeps track of commands relating to RF data that were transmitted by RF collectors, for example, components and platforms that provide results in response to commands. In an embodiment, and the incoming RF signals at each collector may be converted to In-phase and Quadrature (I/Q) components. The method transmits data from the converted I/Q components to a cooperative collection manager (CCM) module via a 5G data link. The CCM module matches the I/Q components received from the platforms and bundles the results together pairwise into DCAF. In an embodiment, an orchestration processing by DCAF may be provided that may be flexible and capable of using the available computational resources optimally. In an embodiment, the CCM may be specifically configured for DCAF systems to track moving and/or hypersonic target objects.

Embodiments relate to a method for detecting moving objects and non-stationary targets from moving platforms using DCAF running in RF samples which provides TDOA/FDOA measurements. More particularly, the disclosure provides a) a concept of time morphism for detecting maneuvering targets and the relationship between time morphism and TDOA/FDOA; b) partitioning of a wideband long dwell time to segments of short and narrow band dwells (long/short correlator); c) derivation of the DCAF formula from the traditional matched filter; and d) efficient and parallel processing of DCAF function.

The embodiments disclosed herein are only examples, and the scope of this disclosure is not limited to them. Particular embodiments may include all, some, or none of the components, elements, features, functions, operations, or steps of the embodiments disclosed herein. Embodiments according to the present disclosure are in particular disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well so that any combination of claims and the features thereof are disclosed and can be claimed regardless of the dependencies chosen in the attached claims. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

FIG. 1 shows an overview of a distributed network environment, according to particular embodiments. FIG. 1 illustrates the distributed network environment 100 with which one embodiment can be implemented and comprises components/elements that are implemented at least partially by hardware at a computing system coupled to cooperative collection manager (CCM) unit 104, dynamic cross ambiguity function (DCAF) parallel processing unit 202, data fusion element 106 and time difference of arrival (TDOA) and frequency difference of arrival (FDOA) search region update 208 and at one or more hardware processors executing stored program instructions stored in one or more memory units for performing the functions that are described herein. In other words, all functions described herein are intended to indicate operations that are performed using programming in a special-purpose computer or general-purpose computer in various embodiments. FIG. 1 illustrates only one of many possible arrangements of components configured to execute the programming described herein. Other arrangements may include fewer or different components, and the division of work between the components may vary depending on the arrangement.

In an embodiment, the distributed network environment 100 may include one or more target objects 101, RF collectors 102*a*-102*n*, a computing system and a computing device having a display device 108. In an embodiment, one or more target objects 101 may be maneuvering targets, terrestrial or airborne, such as aircraft, vehicles, surface vessels, personal devices, and other maneuvering targets associated with emitting or communicating RF signals of any kind, including low-SINR communicating RF signals. FIG. 1 shows only one target object 101 but the embodiments may include 'n' number of target objects. As one example, the target object 101 may be an emitter associated with any kind of low-SINR communicating RF signal.

In an embodiment, the RF collectors 102*a*-102*n* may be configured to collect a plurality of RF signals from the target object 101. In an embodiment, at least three or more RF collectors 102*a*-102*n* may be utilized to collect RF signals. The RF collectors 102 (102*a*-102*n*) may be stationary and/or non-stationary collectors. For example, the RF collectors 102 may be installed on the ground station and/or one or more of the maneuvering objects, for example, ground vehicles, moving vehicles, sea vehicles, automobiles, aircrafts, satellites, and any maneuvering objects. In an embodiment, the RF collectors 102 may be configured to receive raw RF data in RF signals from a target object 101. In an embodiment, the raw RF data may be associated with baseband noise and distortion signals.

In an embodiment, each of the RF collectors 102 may be coupled to or associated with GPS-equipped device to collect navigation data, position data and velocity of each RF collector 102 at a given time. In particular embodiments, the raw RF data in RF signals may be collected from the target object 101 based on a synchronized collection request set or sent by precision geo sensor manager unit 110 and/or data fusion element 106 and/or a computing device associated with display device 108. The collection request may be set as sensor or collection commands at regular intervals or for any given time, for example, 20 seconds, 40 seconds, a minute, or 20 milliseconds, or any unit of time. The sensor or collection commands may be issued by the precision geo sensor manager unit 110 and/or data fusion element 106 and/or the computing device associated with display device 108 to periodically capture and extract RF signals according to dwell start time or dwell time and dwell duration explained with reference to time morphism of FIG. 7A-FIG. 7C. Each sensor or collection command specifies a universally unique identifier (UUID) associated with the collection request.

Figure 2:
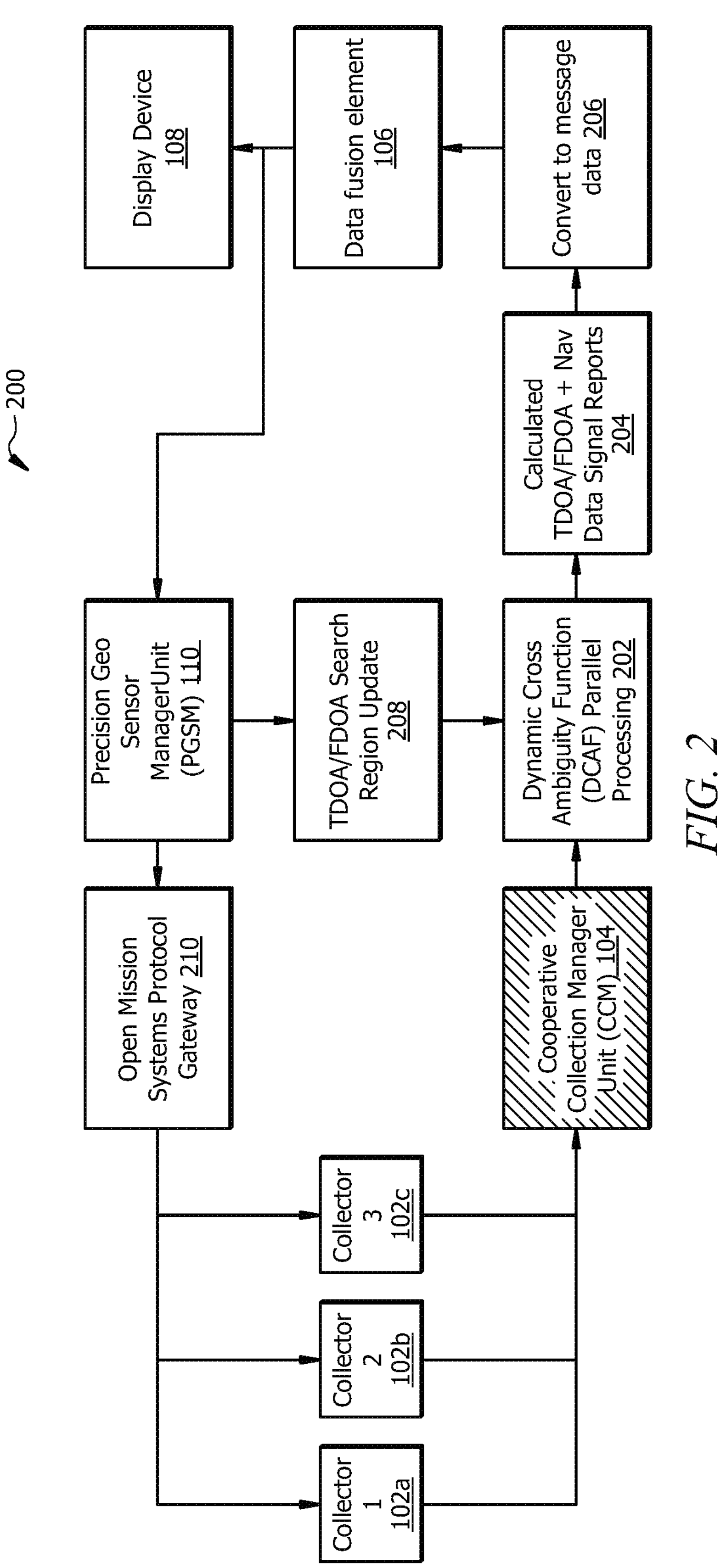
FIG. 2 shows an example of a cooperative collection manager (CCM) unit coordinating the receipt of radio frequency (RF) data and orchestrating processing by a dynamic cross ambiguity function (DCAF) parallel processing unit, according to particular embodiments.

The cooperative collection manager (CCM) unit 104 may be configured in the computing system to coordinate receipt of RF data of RF signals and orchestrate processing by processing functions, for example, DCAF functions by DCAF parallel processing unit 202 (in FIG. 2). In an embodiment, the RF signals at each collector may be converted to In-phase and Quadrature (I/Q) data. The GPS-equipped devices at each RF collector 102 may be utilized to determine the navigation data of each RF collector. From the navigation data, position data, and velocity of the RF collectors may be calculated. From the position data and velocity any maneuverable target object 101 may be tracked and detected. In an embodiment, wherein the I/Q data of each of the RF collectors 102 are paired with the respective navigation data, position data and velocity of the RF collectors 102. For example, for each pair of RF collectors 102, the CCM unit 104 receives the RF signals via 5G data link and bundles the I/Q data, navigation data, position data and velocity of the RF collectors 102. The I/Q data that was bundled into pairwise may be used to perform processing functions, for example, to perform DCAF processing functions on the paired I/Q data of the pair of RF collectors 102.

In an embodiment, the CCM unit 104 may be configured to apply processing functions such as DCAF functions to calculate TDOA and FDOA for each pair of RF collectors 102. In particular, the CCM unit 104 may be configured to determine TDOA measurement data and/or FDOA measurement data between each pair of the RF collectors 102 by using the paired I/Q data of the RF collectors 102. In an embodiment, the DCAF functions and computations may be carried out at multiple stages parallelly on multiple graphics processing units (GPUs). The calculated TDOA measurement data and/or FDOA measurement data, together with one or more of navigation data, position data, and velocity, may be sent to data fusion element 106 in the form of message data. For example, the message data may include tactical data model (TDM) message format for military operations, or any messaging format associated with non-military environments. In an embodiment, conversion of TDOA measurement data and/or FDOA measurement data, together with one or more of navigation data, position data, and velocity to message data may be an optional step. In some embodiments, the CCM unit 104 may be configured to utilize any degree of freedom (DOF), for example, 6 DOF optimal reduced state estimation filter to estimate the position and velocity of each target object to represent as a track candidate for TDOA peaks and FDOA peaks. In an embodiment, the estimation filter may include the Kalman filter. The CCM unit 104 may be configured to track consecutive TDOA measurement data or consecutive FDOA measurement data of the pair of RF collectors 102 and generate a track candidate. An identification of the track candidate may become a new target object for updating a bounding box search region for calculating TDOA peaks and FDOA peaks as described in FIG. 6 and FIG. 9.

The data fusion element 106 may be configured to estimate a trajectory of the target object 101 based on a confidence measure of the one or more of the TDOA measurement data and the FDOA measurement data. For example, the stronger the TDOA measurement data and the FDOA measurement data are, the confidence measure of the trajectory will be high. In this example, confidence measure may indicate an accuracy of the position to within a certain distance. In an embodiment, data fusion element 106 may update the trajectory of the target object 101 to the display device 108 of the computing device associated with the precision geo sensor manager unit 110 or the RF collectors 102.

In an embodiment, data fusion element 106 may use the estimated trajectory of the target object 101 to show in the form of a object and/or ellipsoid display on the display device 108 of the computing device. In some embodiments, the trajectory of the target object 101 from the data fusion element 106 may be used to set TDOA/FDOA search region that may be referred to as a bounding box search region to measure TDOA peaks and FDOA peaks by using the trajectory of the target object 101. For example, the TDOA/FDOA search region, i.e., the bounding box search region, may be updated based on either the initial or latest estimate from data fusion element 106. Subsequently, the updated trajectory of target object 101, including trajectories of other target objects, may be used to update the bounding box search region to measure the consecutive TDOA measurement data and/or FDOA measurement data. In an embodiment, the data fusion element 106 may be a Mahalanobis distance to track consecutive measurements of TDOA measurement data and/or FDOA measurement data along with one or more of navigation data, position data and velocity of the RF collectors 102*a*-102*n*. The data fusion element 106 may use TDOA/FDOA measurement data as well as navigation data to generate track candidates, as described in FIG. 9. The data fusion element 106 may be configured to implement any DOF, for example, 6DOF optimal reduced state estimation filter to estimate the position and velocity of each candidate track. The tracks with the highest confidence measure may be declared as the final candidate for updating the bounding box search region to calculate TDOA/FDOA peaks based on the confidence measure of the trajectory of the track candidates. For example, as the trajectory estimation confidence increases, the DCAF peak search bounding box shrinks and results in a more precise TDOA/FDOA measurement. The updated bounding box search region may be utilized further for time morphism calculation and subsequent/consecutive TDOA measurement data and/or FDOA measurement data of not only the target object 101 but also the other target objects. In an embodiment, the data fusion element 106 may update the TDOA/FDOA measurement data as well as navigation data to the precision geo sensor manager unit 110 at each stage of DCAF functions to set the collection request.

In an embodiment, the display device 108 may correspond to the computing device that may comprise any kind of computing and/or electronic device such as a desktop computer, computer system, laptop computer, tablet computer, mobile computing device, smartphone, personal computers, personal digital assistants (PDAs), laptops, or workstations, notebook, netbook, tablet computer, e-book reader, camera, personal digital assistant (PDA), handheld electronic device, cellular telephone, smartphone, augmented/virtual reality (AR/VR) device, mixed reality (MR) device, other suitable electronic devices, or any suitable combination thereof. Throughout this disclosure, all references to "user" or "users" are specified for convenience but correspond to computing devices/electronic devices that execute the technical steps described in the disclosure. Thus, even where the terms "user" or "users" appear, all steps and functions of the disclosure are intended as computer-implemented steps or technical steps and not manual, mental, human-performed, or abstract steps, each of which is hereby expressly excluded from the scope of the claims and the disclosure. The display device 108 of the computing device may be associated with the precision geo sensor manager unit 110 or the RF collectors 102. In some embodiments, the display device 108 may be associated with data fusion element 106. The display device 108 may be configured to display updated trajectories, a geographic view, an ellipsoid display, and identification of the target object 101 and other target objects.

In an embodiment, each of the components of the distributed network environment 100 may exchange sensor or collection commands, RF signals, RF data, TDOA measurement data, FDOA measurement data, and trajectory information in the form of network packets via a data communication network. Examples of the data communication network include, without limitation, an ad hoc network, an intranet, an extranet, a virtual private network (VPN), a local area network (LAN), a wireless local area network (WLAN), a wide area network (WAN), a wireless wide area network (WWAN), a metropolitan area network (MAN), a portion of the Internet, a portion of the Public Switched Telephone Network (PSTN), near-field communication (NFC) network, a cellular technology-based network, a satellite communications technology-based network, Bluetooth, a cellular telephone network, or a combination of two or more of these networks. In an embodiment, the one or more data communication networks may include any suitable links. For example, the links may include but are not limited to, one or more wireline (for example, Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET), satellite links or Synchronous Digital Hierarchy (SDH)) links. Links need not necessarily be the same throughout the environment 100. One or more links may differ in one or more aspects from one or more other links. The distributed network environment 100 may host or include interfaces that are compatible with one or more networks and are programmed or configured to use standardized protocols for communication across the networks such as application programming interface (API) calls, transmission control protocol (TCP)/internet protocol (IP), Bluetooth, and higher-layer protocols such as hypertext transfer protocol (HTTP), transport layer security (TLS), and the like. One or more interfaces may be utilized to enable communication over the frequency channels/carriers and the interfaces may include switches, access points, routers, wireless fidelity (WIFI) interface, a LAN interface, a WAN interface, or a modem. As a further example, the network interface may include a WIFI interface, a modem, a switch, or a router. In an embodiment, the computing system coupled to cooperative collection manager (CCM) unit 104, DCAF parallel processing unit 202, data fusion element 106 and time difference of arrival (TDOA) and frequency difference of arrival (FDOA) search region update 208 may be configured to use any suitable type of communication protocol as would be appreciated by one of ordinary skill in the art.

FIG. 2 shows an example of a cooperative collection manager (CCM) unit 104 coordinating the receipt of RF data and orchestrating processing by a DCAF parallel processing unit 202, according to particular embodiments. In an embodiment, FIG. 2 illustrates a high-precision geolocation method for detecting and tracking positions and velocity of any maneuverable targets. In an embodiment, the method utilizes CCM unit 104 and a DCAF parallel processing to detect and track moving targets transmitting any kind of high or low SINR, wideband RF signals including low-SINR communicating RF signals. Traditionally, the processing of raw RF data may require a high computational load, and the high-precision geolocation architecture of FIG. 2 may be configured for real-time processing and geolocation using TDOA/FDOA geo-observables. The high-precision geolocation architecture may be configured to interoperate with the RF collectors 102 communicatively, CCM unit 104, DCAF parallel processing unit 202, data fusion element 106, display device 108 and precision geo sensor manager unit 110. In an embodiment, the high-precision geolocation architecture includes tracking of any maneuvering target objects 101 or emitters 101 using at least three RF collectors 102 (102*a*, 102*b*, and 102*c*).

In an embodiment, the RF collectors 102 may be configured to receive RF signals from a target object 101. The RF collectors 102 may be configured to perform real-time passive detection of RF signals of the target object 101 that may be emitting only low SNR communication signals. The RF signals from the target object 101 may be received based on sensor or collection commands issued periodically to capture the RF signals according to dwell start time and dwell duration. Each sensor or collection command specifies a UUID associated with a collection request. In an embodiment, an operator or a user associated with the precision geo sensor manager unit 110 may be configured to set periodic broadcasting of a synchronized collection request through the open mission systems gateway (OMSG) 210. The precision geo sensor manager unit 110 periodically issues a collection request in the form of sensor or collection commands. Each command contains a universally unique identifier (UUID) associated with each collection request. In an embodiment, the issued sensor or collection commands from precision geo sensor manager unit 110 include fields that may parsed by each RF collector 102 to determine one or more of the issued collection command ID, scan frequency, plan frequency, type of collection, dwell start, swell duration time, etc. Table 1 shows the sensor or collection command fields.

TABLE 1

| Sensor or collection command fields | Description |
|---|---|
| Command ID | Command identifier |
| Activity ID | Activity identifier |
| Message time | Time the message was generated. |
| Frequency | Mean frequency of RF signal |
| Frequency Max | Maximum frequency of RF signal |
| Frequency Min | Minimum frequency if RF signal |
| Type of collection | Identifies a multi-platform collection |
| Number of collection dwells | Number of discrete dwells |
| Collection repetition intervals | Intervals to trigger RF signal collection based on collection requests set at given intervals |
| Dwell start time | Time the dwell should start. |
| Dwell duration | Duration of I/Q data collection |
| Number of collectors (platforms) | Number of collectors (platforms) participating |

In an embodiment, the issued sensor or collection commands from precision geo sensor manager unit 110 may be broadcast to each RF collector 102 via OMSG 210 and the CCM unit 104. The RF signal collection may be described with reference to FIG. 3.

Figure 3:
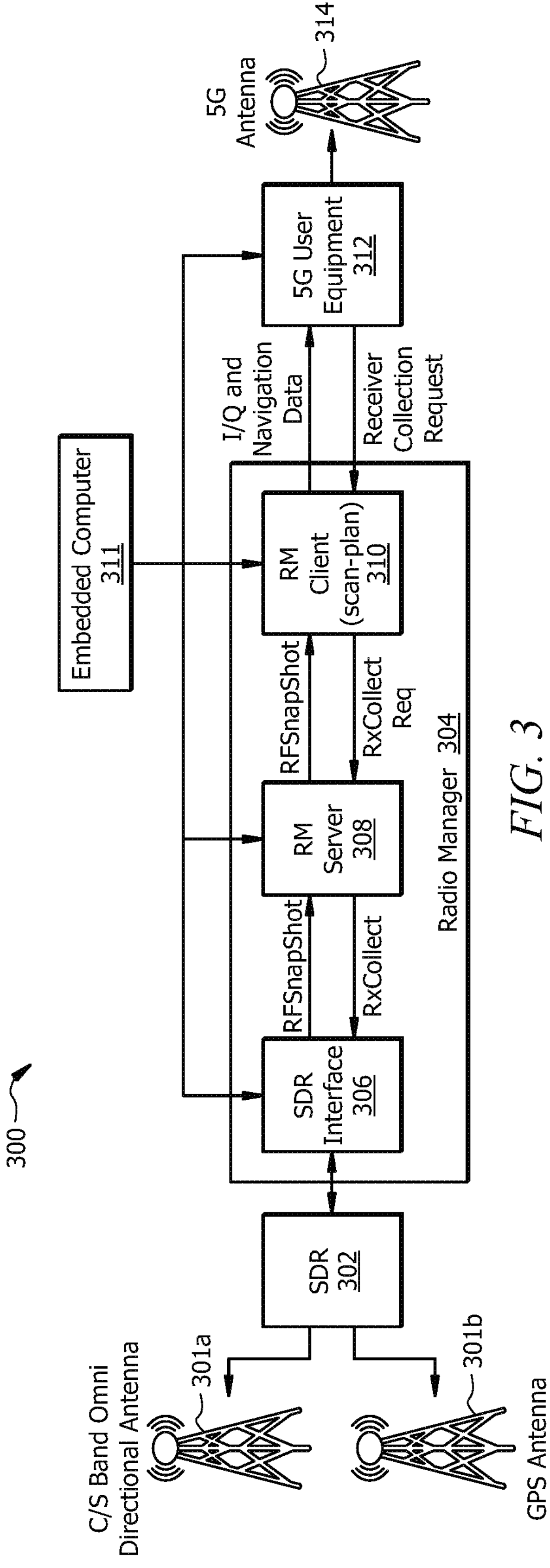
FIG. 3 depicts an example of collectors and RF services architecture according to particular embodiments.

FIG. 3 shows an example of RF collectors and RF services architecture. The architecture shows antenna 301*a*, 301*b*, software-defined radio (SDR) 302, a radio manager 304, an embedded computer 311, user equipment (UE) 312, and a base station, for example, 5G antenna 314. In an embodiment, the 5G antenna 314 may be a base station that may be connected to a 5G UE 312. The UE 312 may be capable of receiving collection request commands from embedded computer 311. In an embodiment, the embedded computer 311 may be a computer system associated with the precision geo sensor manager unit 110, and/or data fusion element 106. The embedded computer 311 controls the RM client 310/RM server 308, SDR interface 306 and UE 312 (5G UE). The embedded computer 311 may set the collection request (sensor collection commands) commands to transmit collection requests to the RF collectors to collect RF signals from target objects 101 and navigation data, position data and velocity from RF collectors 102*a*-102*n* at a present or future coordinated universal time (UTC). In an embodiment, the UE 312 may transmit the collection request to the radio manager 304. The radio manager (RM) 304 includes an SDR interface 306, RM server 308, and an RM client (scan-plan) component 310.

The collection request transmitted by UE 312 may be received by the RM client (scan-plan) component 310. The RM client (scan-plan) component 310 may transmit or publish the collection requests to the RM server 308 that eventually may be converted to a desired SDR API command and sent to the SDR 302 via SDR interface 306. In an embodiment, the SDR 302 may be a multi-channel RF receiver that may be capable of sampling wideband signals, for example, up to 80 MHz bandwidth per channel over a carrier frequency range of 2 GHz to 6 GHz. The SDR 302 may be programmed by internal API commands to collect RF signals in a desired bandwidth, sample frequency and carrier modulation at a specific UTC time synchronized with GPS IPPS signal. The SDR 302 may coordinate with antennas 301*a* and 301*b* coupled to the SDR 302 to detect and receive the RF signals from moving target objects 101. In an embodiment, the antenna 301*a* may be a C band/S band (C/S Band) omnidirectional antenna, and the antenna 301*b* may be a GPS antenna. The RF signals received by the SDR 302 from the antennas 301*a* and 301*b* may be converted to I/Q data. The I/Q data with one or more of navigation data, position data and velocity may be referred to as RFsnapshot, and in an embodiment, collected I/Q data (RFSnapShot) may be fetched from the SDR internal buffer of the SDR 302 and transferred to the RM server 308 and RM client 310. The collected I/Q data, along with navigation data of each antenna 301*a* and 301*b*, may be sent to UE 312 and to the 5G antenna 314. For example, the collected RF I/Q data and navigation data of each RF collector 102 (102*a*-102*n*) may be transmitted back to the base station of the CCM unit 104. For example, when the sensor or collection commands are received, the Radio Manager (RM) in each collector processes and captures the RF signal at the designated "dwell start time" and "dwell duration" as shown in Table 1. Then, RM attaches additional context to each collected RF I/Q data, including the platform, command from PGSM, and the navigation data from the onboard GPS system, and creates a unique packet of data called RFSnapShot. In an embodiment, the RFSnapShot packet from each collector may be transmitted back to the base station's CCM unit 104. The CCM unit 104 may be configured to store each command ID together with the associated list of RF collector IDs in a queue as shown in FIG. 4.

Figure 4:
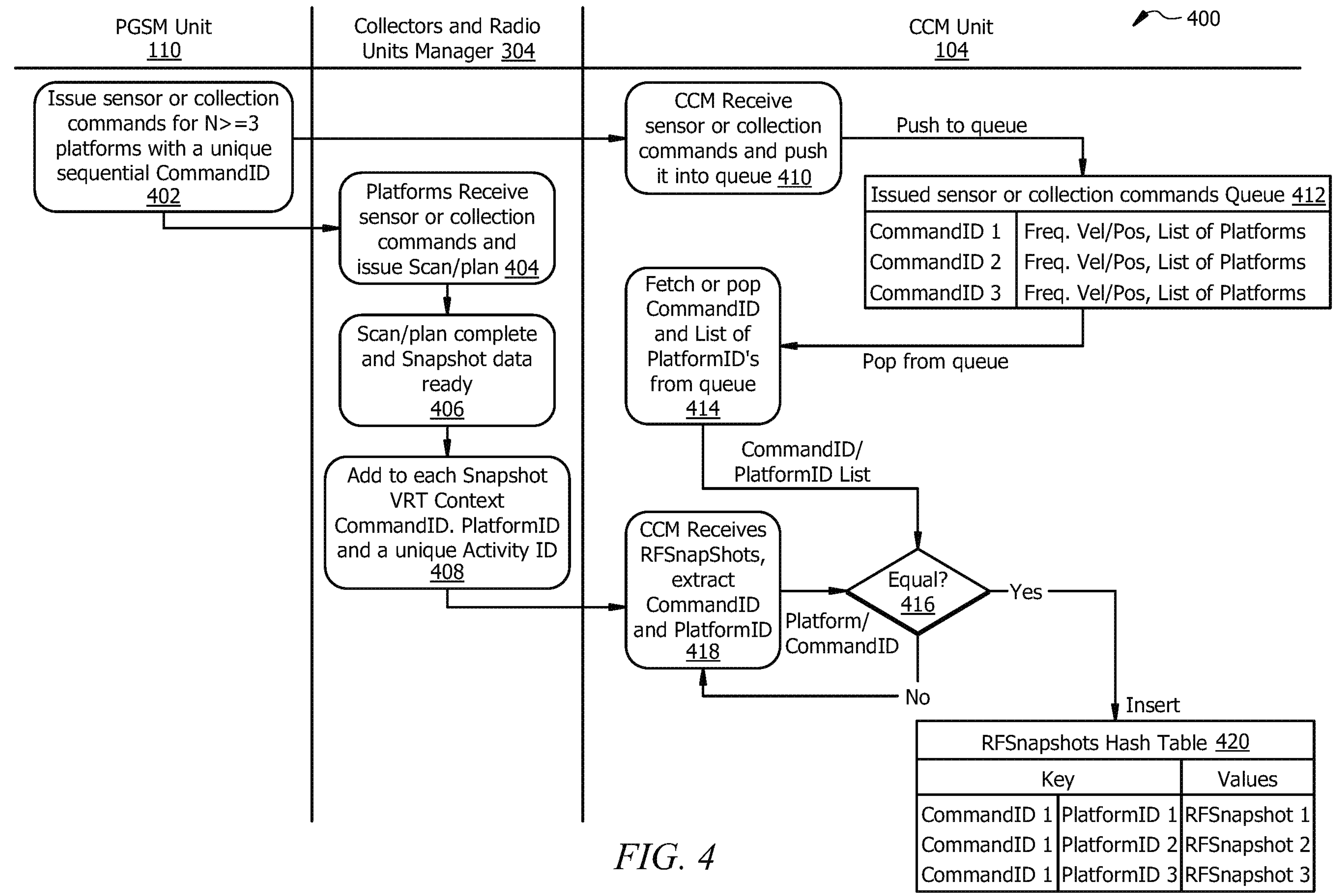
FIG. 4 illustrates the functionality of a CCM module according to particular embodiments.

FIG. 4 illustrates the functionality of a CCM unit 104 according to particular embodiments. In an embodiment, at step 402, the precision geo sensor manage unit 110 may issue sensor or collection command with each sensor or collection command associated with command ID (UUID). The CCM unit 104 may be configured to store each command ID together with the associated list of RF collector IDs in a queue at step 410. Table 412 shows the sensor or collection commands pushed to the queue. The queue for example may include different command IDs, for example, commandID 1, commandID 2 and commandID 3. Each of the command IDs is associated with frequency, velocity, and position data. Each command ID may also include a list of platforms, for example, a list of RF collectors in use that detected the RF signals of the target object 101. Once CCM unit 104 receives the RFSnapShots (created using the flow from FIG. 3), the CCM unit 104 parses the commandIDs and platformIDs at step 418. In particular embodiments, the platform i.e., collector 102 receives sensor or collection commands and issue scan/plan frequencies as shown at step 404. At step 406, the RFSnapShot data may be created with the conversion of RF signals to I/Q data, the navigation data, position data and velocity of the RF collector 102 according to the scan/plan frequency. For each RFSnapShot may be added with VRT context commandID, platformID, and a unique activity ID at step 408. The CCM unit 104 also selects the oldest issued command, for example, commandID 1 in this case, from the head of the sensor or collection command queue table 412 at step 414 and compares it with the parsed data at step 416. In an embodiment, at step 414, the stored commands are popped from the queue with commandIDs and platformIDs. From comparison at step 416, ff both commandID and platformID of sensor or collection command list and RFSnapShot of step 418 are matched, the CCM unit 104 stores the received message into the RFSnapShots hash table 420. Once all the collectors completed sending their own RFSnapShot message to CCM unit 104, commandID and platformID may be stored in the hash table 420 associated with one single dwell, as shown in FIG. 4, showing three rows of commandIDs and platformIDs. In this way, the CCM unit 104 may be configured to uniquely associate each commandID of dwell to the incoming RFSnapShots from each collector allowing the high precision geolocation system to collect each RF signal even if the RF signals arrive out of order at the CCM unit 104. Based on each dwell data, the CCM unit 104 bundles RFSnapShots into pairs, for example, three pairs of 1-2, 2-3 and 1-3. Each pair of RFSnapShots contains I/Q data as well as navigation data from each collector 102 or platform. The paired I/Q data and navigation data along with position data and velocity of the RF collectors 102, may be transmitted to a DCAF parallel processing unit 202 of a DCAF system to generate TDOA measurement data and/or FDOA measurement data.

Referring back to FIG. 2, the DCAF parallel processing unit 202 may be installed in the CCM unit 104. The DCAF parallel processing unit 202 may be configured to apply processing functions on the paired I/Q data of the RF collectors 102. The paired I/Q data and navigation data along with position data and velocity of the RF collectors 102, may be transmitted to a DCAF parallel processing unit 202 to generate TDOA measurement data and/or FDOA measurement data. Using the paired I/Q data of the RF collectors 102, one or more of TDOA measurement data and FDOA measurement data between each pair of the RF collectors 102 may be determined by the DCAF parallel processing unit 202.

Figure 5:
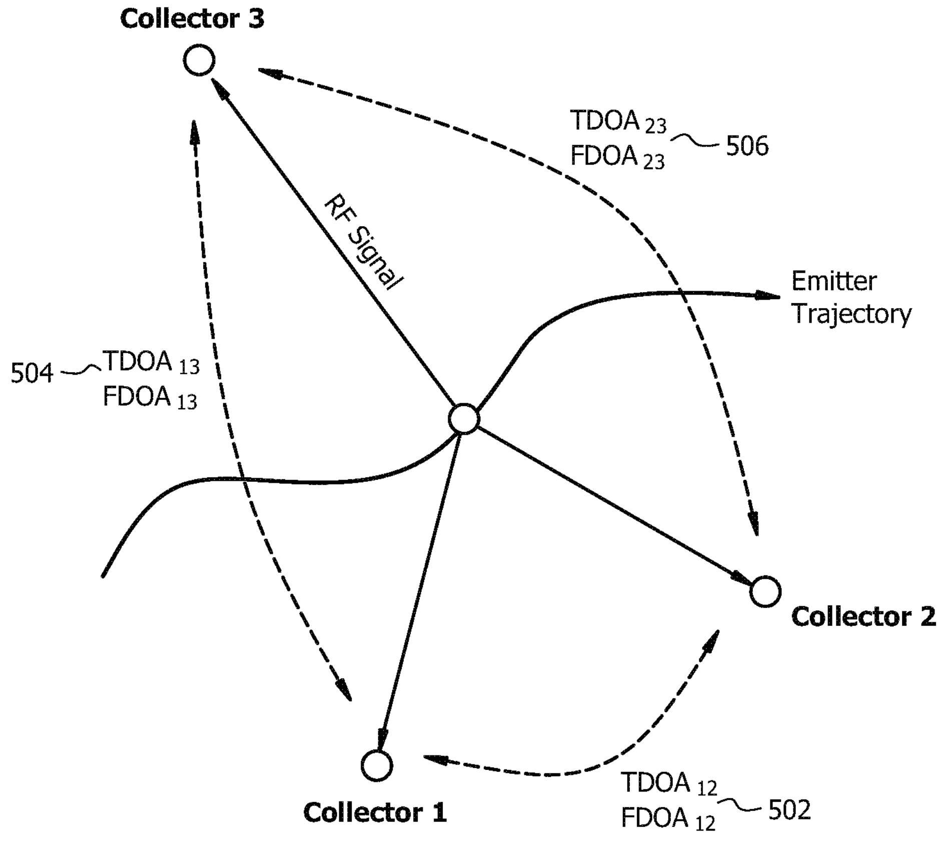
FIG. 5 illustrates the calculation of the Time Difference of Arrival (TDOA) and Doppler Frequency Difference of Arrival (FDOA) between each pair of collectors, according to particular embodiments.

FIG. 5 illustrates the calculation of the TDOA measurement data and FDOA measurement data between each pair of collectors 102, for example, collector 1, collector 2 and collector 3, according to particular embodiments. Each collector (collector 1, collector 2 and collector 3) may collect RF signals from the target object 101. For each pair of collectors 102, the DCAF parallel processing unit 202 may determine TDOA measurement data and/or FDOA measurement data. For example, $TDOA_{12}$ and $FDOA_{12}$ denoted by 602 may be determined between collector 1 and collector 2. $TDOA_{13}$ and $FDOA_{13}$ denoted by 604 may be determined between collector 1 and collector 2 and $TDOA_{23}$ and $FDOA_{23}$ denoted by 606 may be determined between collector 1 and collector 2. An emitter trajectory 608 may be determined based on the TDOA measurement data and/or FDOA measurement data between each pair of collectors 102.

Based on the TDOA measurement data and/or FDOA measurement data, calculated TDOA/FDOA along with navigation data signal reports 204 may be created. The calculated TDOA/FDOA measurement data, together with navigation data, may be converted to message data. For example, the message data may include TDM (tactical data model) message format 206, and/or non-tactical messages in commercial environments. In an embodiment, the emitter trajectory 608 of the target object 101 may be determined by data fusion element 106 based on a confidence measure of the one or more of the TDOA measurement data and the FDOA measurement data. The emitter trajectory 608 of the target object 101 may be used for displaying on the display device 108. In an embodiment, the trajectory 608 may be used by the computing system 100 or any computing device of the third-party entity associated with displaying the trajectory of the target object 101 on the display device. The precision geo sensor manager unit 110 may be configured to receive the updated emitter trajectory 608 and send the updated emitter trajectory 608 together with an error bound to the TDOA/FDOA search region update 208 as a sensor or collection command.

In an embodiment, data fusion element 106 may calculate emitter 101 trajectory and error bound estimate and transmit to the TDOA/FDOA peaks search region update 208 by the precision geo sensor manager unit 110 for creating a bounding box search region for TDOA/FDOA peaks. At the initial stage, TDOA/FDOA peaks search region update 208 may use a default and initial search region. For example, TDOA/FDOA search region update 208 may be updated based on either the initial or latest estimate from data fusion element 106.

In an embodiment, consecutive TDOA/FDOA measurements may be tracked based on Mahalanobis distance. For example, the data fusion element 106 uses Mahalanobis distance to track consecutive measurements of TDOA/FDOA and navigation data. With the tracking of consecutive TDOA measurement data and/or FDOA measurement data may update the trajectory of the target object 101 and the bounding box search region. The process of calculating the TDOA measurement data and the FDOA measurement data and estimating the trajectory 608 of the target object 101 and TDOA/FDOA peaks may be repeated consecutively in regular time intervals or particular time intervals, for example, 20 seconds, 40 seconds, etc. At each stage of the TDOA/FDOA peaks measure, the bounding box search region may be updated using the confidence measure of the TDOA measurement data and/or FDOA measurement data and a track candidate. The track candidate may be associated with an increase in confidence of the estimation of the trajectory of the target object 101 and other target objects. For example, as the confidence of the trajectory estimation increases, the bounding box search region of the TDOA peak and/or FDOA peak search shrinks and results in a more precise TDOA/FDOA measurement. For example, as the confidence in emitter trajectory 608 estimation increases, the TDOA/FDOA search region for the TDOA/FDOA peaks may be narrowed down. In an embodiment, the updated bounding box search region may be utilized in repeating subsequent DCAF functions for TDOA measurement data and/or FDOA measurement data, trajectory 608 of the target object 101 including other target objects and TDOA peaks/FDOA peaks may be utilized to update the display of the trajectory and the bounding box search region in a loop. In an embodiment, the data fusion element 106 may be configured to implement a 6DOF optimal reduced state estimation filter to estimate the position and velocity of each candidate track. The tracks with the highest confidence measure may be declared as the final candidate. In an embodiment, the CCM unit 104 utilizes any degrees of freedom (DOF), for example, the 6DOF optimal reduced state estimation filter to estimate the position and velocity of each candidate track. The candidates or objects that are tracked with the highest confidence measure may be declared as the final candidate and published on display device 108 of the computing device that may be associated with the precision geo sensor manager (PGSM) unit 110 in message data and/or RF collectors 102.

Figure 6:
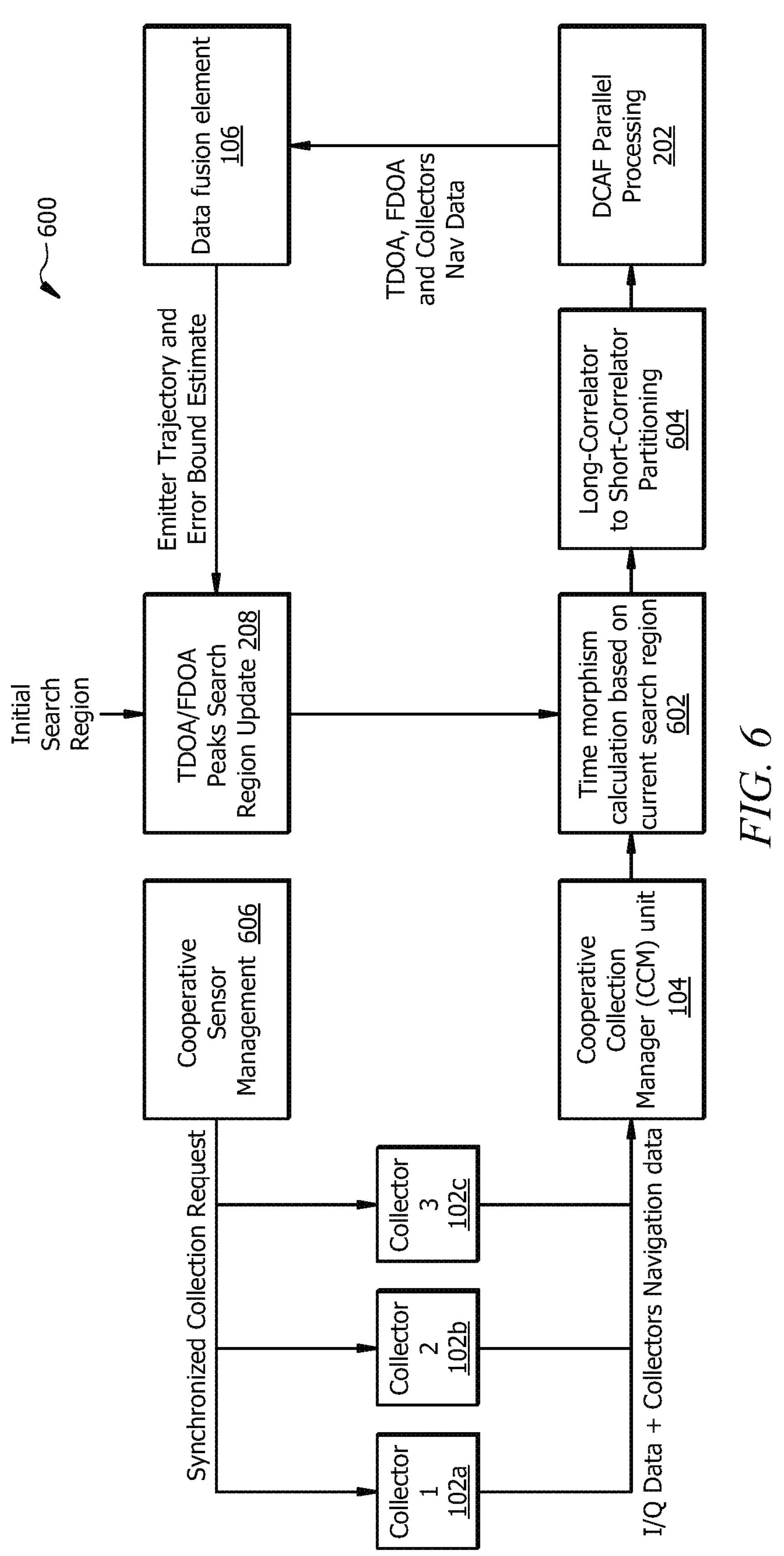
FIG. 6 illustrates a geolocation method for detecting and tracking the position and velocity of a maneuvering target object transmitting communication RF signals including low-SINR signals, according to particular embodiments.

FIG. 6 illustrates a geolocation approach for detecting and tracking the position and velocity of any maneuvering target object transmitting RF signals including low-SINR communication RF signals according to particular embodiments. The geolocation approach includes a synchronized collection of RF signals from a target object 101 by at least three RF collectors 102 (RF receivers—102*a*, 102*b*, 102*c*), calculating TDOA measurement data and FDOA measurement data between each pair of collectors 102, and transmitting TDOA measurement data and/or FDOA measurement data in conjunction with the navigation data including RF collector's position data and velocity data to the data fusion element 106 (sensor fusion engine 106) to construct an estimate trajectory of the target object 101, for example, trajectory of the emitter 101.

In an embodiment, the synchronized collection may be triggered from a synchronized collection request received from or set by cooperative sensor management unit 606. The cooperative sensor management unit 606 may be associated with the computer system of the precision geo sensor manager unit 110 from FIG. 1 or maybe a separate unit associated with a manager or operator to set the timing for collection requests. In an embodiment, the operator associated with cooperative sensor management unit 606 may set a regular time interval or a time at which the synchronized collection request may be triggered or performed by the RF collectors 102. The synchronized collection includes a collection of the transmitted RF signals from the target object 101 by at least three RF collectors 102, for example, collector 1-102*a*, collector 2-102*b*, and collector 3-102*c*. In an embodiment, the RF signals from the target object 101 may be received or detected by the RF collectors 102 based on sensor or collection commands. The sensor or commands may be set periodically according to dwell time and dwell duration. The dwell time may be calculated or determined by performing adequate coherent processing of the RF signals from each of the RF collectors 102. For example, the lower SNR or bandwidth of the incoming RF signals may be associated with longer dwell time. The CCM unit 104 may be configured to convert the RF signals from the RF collectors 102 to I/Q data, for example, I/Q components, and the conversion includes removing baseband modulations from the RF signals. Navigation data of each RF collector (collector 1, collector 2, collector 3) 102 may then be determined by the CCM unit 104. In an embodiment, the I/Q data of each of the RF collectors 102 may be paired together along with the respective navigation data of each RF collector 102. The navigation data may be determined from a GPS-equipped device associated with the RF collectors 102. At a given time, using the onboard GPS-equipped devices, the position and velocity of RF collector 102 may be detected and tracked. In an embodiment, the navigation data, position, and velocity of each of the RF collectors 102 may be determined using time morphism calculation based on a current search region. At block 602, time morphism calculation may be described with reference to FIG. 7A-7C that illustrates the process of time morphism. In an embodiment, the current search region for time morphism calculation may be obtained from TDOA/FDOA peaks search region update unit 208. The TDOA/FDOA peaks search region update unit 208 may provide the bounding box search region to measure TDOA peaks and FDOA peaks by using the trajectory of the target object 101. In an embodiment, the bounding box search region may be updated initially by using the initial search region formed from the trajectory of the emitter 101/target object 101. Consecutively, the bounding box search region may be updated based on a confidence increase in the estimation of the trajectory of the emitter/target object 101.

Figure 7A:
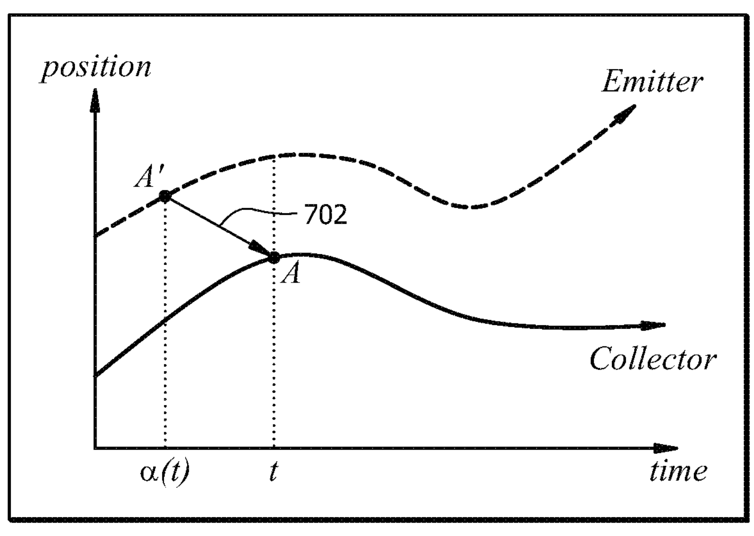
FIG. 7A-FIG. 7C illustrates the process of time morphism according to particular embodiments.

Referring to FIG. 7A, the position of the target object 101, for example, an emitter, and Rf collector, for example, collector 1, may be detected over time. For example, at time t, the collector 1 receives a RF signal from the emitter 101. Since the emitter 101 moves with an arbitrary and potentially large velocity and acceleration. In an embodiment, the collectors 102, for example, collector 1, may be moving arbitrarily with varying velocity and acceleration. The arbitrary movement of the collector 1 may form and show the collector trajectory and the emitter 101 may form and show actual emitter trajectory at varying times. The actual RF signal from the emitter 101 might have been emitted at a point in time a (t) that may be marked by A'. The function α(t) may be a function of current reference time at collector 1 as well as position, velocity and acceleration of emitter 101 and collector 1 (102*a*) as represented by:

a) Time Morphism Function:=$\alpha(t)=\alpha(t, \vec{p}_c, \vec{p}_c, \vec{a}_c, \vec{p}_E, \vec{v}_E, \vec{a}_E)$ b) $\vec{p}_c, \vec{v}_c, \vec{a}_c$: position, velocity, and acceleration of collector 1 (102*a*)

c) $\vec{p}_E, \vec{v}_E, \vec{a}_E$: position, velocity, and acceleration of emitter 101

In an embodiment, the function α(t) may be expressed as:

$$t-\alpha(t)=\frac{1}{c}\left\|\vec{p}_c(t)-\vec{p}_E(\alpha(t))\right\|;$$

where "‖•‖" may be the Euclidian norm or distance denoted by 702 between points A and A'. Assuming a simple ballistic dynamics for emitter and collector, α(t) function may be calculated as a Taylor Series polynomial represented as:

a)

$$\vec{p}_c(t)=\vec{p}_c(0)+\vec{v}_c(0)t+\frac{1}{2}\vec{a}_c(0)t^2$$

b)

$$\vec{p}_E(t)=\vec{p}_E(0)+\vec{v}_E(0)t+\frac{1}{2}\vec{a}_E(0)t^2$$

c)

$$\alpha(t)=\tau_0+\tau_1 t+\frac{1}{2!}\tau_2 t^2+\dots .$$

Figure 7B:
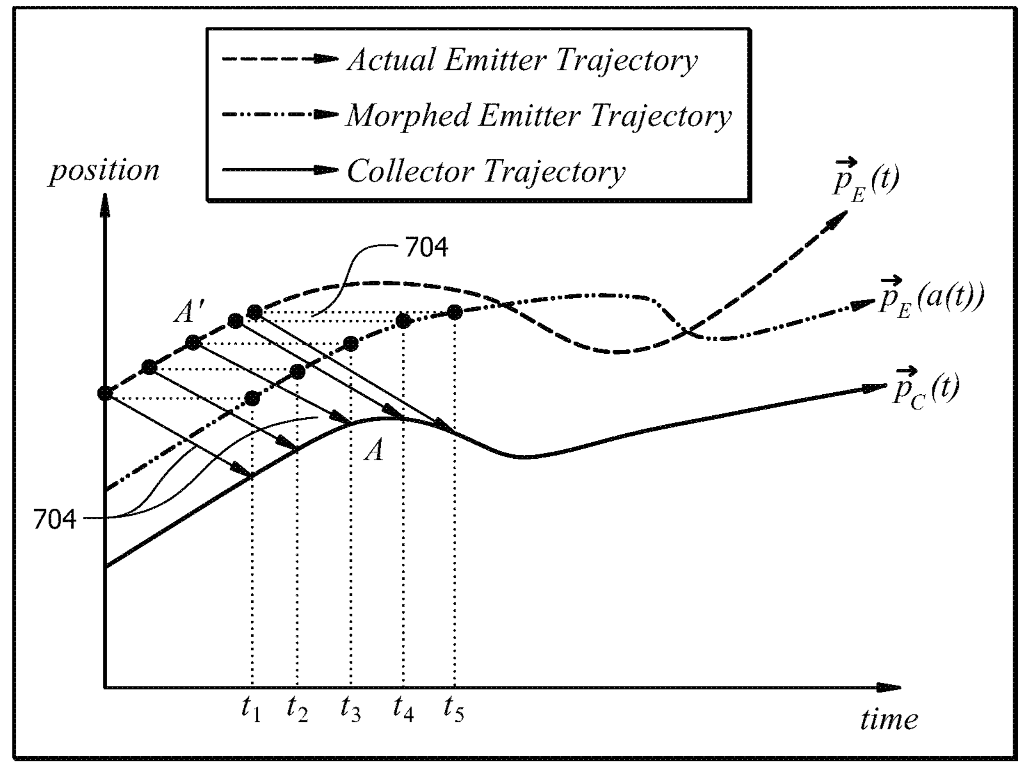

Referring to FIG. 7B, time morphism function may be created for each collector-emitter pair (102*a*-101 pair; 102*b*-

101 pair; 102c-101 pair). The pairing of each of the RF collectors 102 with the emitters 101 allow calculation of the cross correlation between receiving RF signals from emitter 101 at each collector (102) using a unique and consistent time reference. For example, if the A-A' pairs denoted with numeral 704 are mapped then a morphed trajectory of emitter 101 may be viewed in a reference time $\vec{p}_E(\alpha(t))$ at collector 102*a*. As shown in FIG. 7B, the series of arrows denoted with numeral 704 show a fixed slope velocity equal to speed of light c. In an embodiment, the series of arrows denoted with numeral 704 may correspond to position versus time plots of the traveling RF signal and the traveling RF signals depicts speed of light c. The morphed trajectory "$\vec{p}_E(\alpha(t))$" may be used to calculate the TDOA measurement data and/or FDOA measurement data between various collectors, for example, RF collectors 102*a*, 102*b* and 102*c*.

Figure 7C:
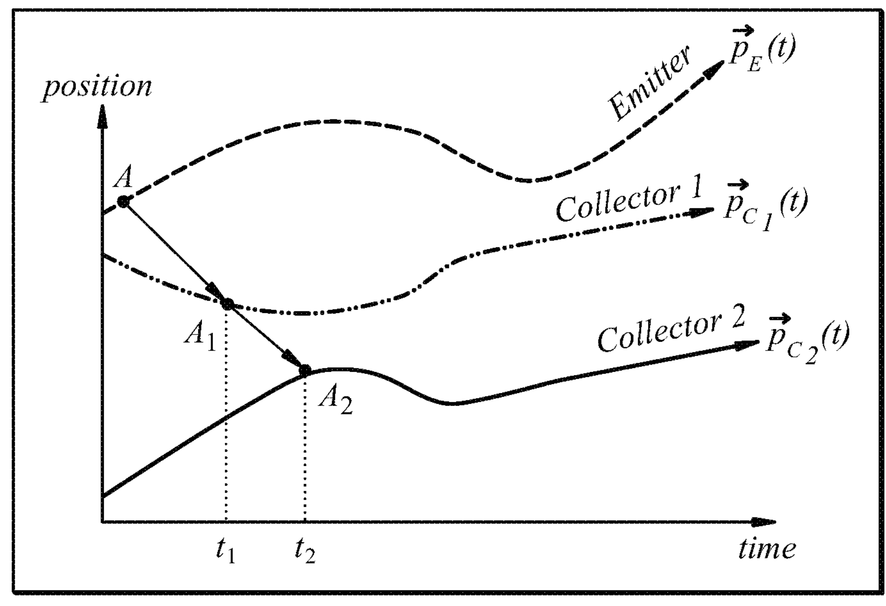

Referring to FIG. 7C, all the collectors, for example, collector 1 and collector 2, start a collection of RF signals from the emitter 101 at a synchronized time equal to t. However, the received RF signal at each given time=t at the collector side corresponds to different emitted time at emitter 101. Therefore, calculating the TDOA measurement data and/or FDOA measurement data between collector 1 and collector 2 translates to estimating two different time morphism functions a (t) and (t) that maps the receiving RF signals at each collector to the maximum amount of correlation both in time and frequency (so called traditional matched filter). As shown in FIG. 7C, time morphism of any receiving RF signal from emitter 101 at collector 1=α(t) and time morphism of any receiving RF signal from emitter 101 at collector 2=β(t). In an embodiment, the emitted signal from emitter 101 as E(t) which may be a demodulated baseband signal (at carrier frequency $f_0$) may be expressed in the form of complex valued I/Q data. Then, the received RF signals at collector 1 and collector 2 are E(α(t)) and E(β(t)) respectively. In an embodiment, a new function called ρ(t) may be created in order to match E(α(t)) and E(β(t)). The function ρ(t) may also be expressed in the form of time morphism polynomials, that results in a perfect match between E(α(t)) and E(β(t)) or more precisely ρ(t) maximizes the following matched filter: $L[\rho]=\int E^*(\beta(t))E(\alpha(\rho(t))dt$. In an embodiment, L[ρ] is called long correlator and can be maximized at: $\rho_{max}(t)=\alpha^{-1}(\beta(t))$. As shown in FIG. 7C, the emitter 101 may emit a RF signal at point A where the RF signal may be received at collector 1 and collector 2 at points $A_1$ and $A_2$ at times $t_1$ and $t_2$ respectively. The TDOA measurement data and FDOA measurement data between collector 1 and collector 2 can be calculated as:

$$TDOA_{12} = \frac{\|\vec{p}c_1(t_1) - \vec{p}_E(a(t_1))\|}{c} - \frac{\|\vec{p}_{C_2}(t_2) - \vec{p}_E(\beta(t_2))\|}{c} = (t_1 - \alpha(t_1)) - (t_2 - \beta(t_2))$$

In an embodiment, ρ(t) transforms (or translates) $t_1$ to $t_2$ so that E(α(t)) perfectly match to E(β(t)). Particularly, the TDOA measurement data may be calculated as:

$$TDOA_{12} = \rho(t) - t.$$

The FDOA may be calculated as follows:

$$FDOA_{12} = f_0\frac{\frac{d}{dt}\|\vec{p}_{C_1}(t_1) - \vec{p}_E(\alpha(t_1))\|}{c} - f_0\frac{\|\vec{p}_{C_2}(t_2) - \vec{p}_E(\beta(t_2))\|}{c} = f_0\frac{d}{dt}(t_1 - \alpha(t_1)) - f_0\frac{d}{dt}(t_2 - \beta(t_2))$$

Where $f_0$ is the carrier frequency. Consequently, in terms of ρ(t) the FDOA may be expressed as:

$$FDOA_{12} = f_0\frac{d}{dt}(\rho(t) - t).$$

The time morphism transformation function $$\rho(t) = \rho_0 + \rho_1 t + \frac{1}{2!}\rho_2 t^2 + \dots$$

may be expanded as Taylor series the TDOA measurement data and FDOA measurement data can be expressed as:

a)

$$TDOA_{12} = \rho_0 + (\rho_1 - 1)t + \frac{1}{2!}\rho_2 t^2 + \cdots$$

b)

$$FDOA_{12} = f_0[(\rho_1 - 1) + \rho_2 t + \dots\ ]$$

In an embodiment, the time morphism calculation from block 602 may be provided to the long correlator to short correlator partitioning unit 604. In an embodiment, the long correlator may be longer segments (long dwell segments of dwell times) of TDOA measurement data and FDOA measurement data and short correlator may be short segments (short dwell segments of dwell times) of TDOA measurement data and FDOA measurement data. For calculating long correlator and/or short correlator, the calculation of TDOA measurement data and FDOA measurement data may be broken down or converted over a long period of dwell time for a dwell duration into smaller segments of short dwell time. For example, the long correlator L[ρ] may be partitioned to a series of short dwell time L[ρ(t)] where in each of short dwell time "t" is referenced to some short sequence of dwells (for example several milliseconds). For short dwell time condition, all the terms that depend on t become negligible. The TDOA measurement data and FDOA measurement data can be represented as:

a)

$$TDOA_{12} = \rho_0$$

b)

$$FDOA_{12} = f_0(\rho_1 - 1)$$

In particular embodiments, the conversion of TDOA measurement data and FDOA measurement data into smaller segments of short dwell time may be advantageous for processing longer dwell time caused in maneuvering targets emitting associated RF signals including low-SINR communication RF signals. The longer dwell time may be necessary in order to increase the coherent processing gain of all collectors 102. However, calculating the TDOA measurement data and/or FDOA measurement data for a long dwell time may involve complicated process as the emitter 101 movement during long dwell time may not be assumed insignificant. The short dwell time helps in segmenting long dwell time into smaller segments. The conversion of TDOA measurement data and FDOA measurement data into smaller segments of short dwell time may be also advantageous for calculating the cross-correlation between two narrow-band signals which typically produce more accurate results (more detectable peaks) than two wide-band signals. In an embodiment, converting the wide-band with longer dwell time to a series of short dwell time of narrow-band signals and at the end combine all the short dwell segments to get a more precise estimate for overall TDOA measurement data and FDOA measurement data. In an embodiment, the partition of the dwell into short dwell time that may be short enough that the time-morphism calculation at block 602 shows well-approximated by a linear polynomial over the duration of conversion. In an embodiment, an upper bound constraint on the duration of each segment may be expressed as:

$$T < \frac{\delta\phi}{\sqrt{\frac{1}{2}\max(F)\cdot\max(|a|)}}$$

where $\delta\phi$ is maximum allowed number of cycles of phase error, max(F) is the maximum frequency included in the frequency band (i.e. bandwidth) and $\alpha$ is the second-derivate of the time morphism function (acceleration).

In some embodiments, long dwell segments may be broken down into short dwell segments of $I_n$ where on each short dwell segment the time-morphism transformation function $\rho(t)$ may be represented as: $\rho(t)=\gamma_n t+\tau_n$. The Fourier transform of each of short segmented I/Q data may be expressed as:

a)

$$a_n(t) = \int A_n(\omega)e^{i\omega t}d\omega$$

b)

$$b_n(t) = \int B_n(\omega)e^{i\omega t}d\omega$$

In an embodiment, the short dwell segments may be combined, and the overall long correlator may be approximated by:

$$L[\rho] = \sum_n e^{-i2\pi f_0\tau_n}\int B_n^*(\omega)A_n(\omega+\omega_n)e^{i\omega\tau_n}d\omega$$

where In corresponds to TDOA and $\omega_n=2\pi f_0(\gamma_n-1)$ corresponds to FDOA frequency shift.

The long dwell segments and short dwell segments may provide various benefits for example, larger coherent processing gain of all RF collectors 102. This way of coherent processing gain addresses any maneuvering target object 101 and breaks down a wide-band signal to series of narrow-band that results in a more detectable cross-correlation peaks, for example, TDOA peaks and FDOA peaks.

The short dwell segments from long correlator into short correlator partitioning unit 604 may be sent to DCAF parallel processing unit 202 via a high-speed link. In an embodiment, short dwell segments may be processed in parallel using the GPU parallel processing to expedite the DCAF parallel processing 202. The DCAF parallel processing unit 202 may be a central processing station. In an embodiment, the calculation of TDOA measurement data and FDOA measurement data between each pair of RF collectors 102 includes the implementation of DCAF processing to calculate TDOA measurement data and FDOA measurement data for each pair of collectors using I/Q data. For example, the DCAF parallel processing unit 202 may be configured to create three different pairs of collectors 102, such as, collector 1-collector 2 (A-B), collector 2-collector 3 (B-C) and collector 3-collector 1 (A-C) collectors at each dwell where each pair can be performed on one individual GPU. The feature of pairing the collectors 102 may include (a) approximation of a long correlation function with DCAF function at the DCAF parallel processing unit 202 using short correlation segments (short swell segments), (b) a time morphism approximation (at block 602), (c) parallelization of short correlation segment computation across and within GPUs, (d) DCAF function implementing a peak detection algorithm with multi-peak finding enabling future multi-target detection, (c) a linear time morphism approximation to model the kinematic dynamics of platform and target movement as a time scaling and offset factor that accounts for the physics of time compression/expansion that resulted in differences of signals captured by moving platforms collecting a moving emitted RF signal from the emitter 101. The feature of pairing the collectors 102 may further include, but are not limiting to, consideration of number of short correlation segments from a tip and tune processing of DCAF function at DCAF parallel processing unit 202, usage of a BinarySignalFile custom object by the DCAF parallel processing unit 202 for internal data representation which includes header metadata, raw binary data and hash values for representation of RF signals at each of RF collectors 102, performing the peak detection algorithm of the DCAF function to calculate TDOA peaks and FDOA peaks from the TDOA measurement data and FDOA measurement data that uses CAF peak SNR thresholding to distinguish RF signal correlation peaks from noise, tracking of moving/stationary targets from moving/stationary platforms and maneuvering targets using DCAF's TDOA/FDOA measurement data, integration of DCAF with COTs (commercial off-the-shelf) sensors and SDRs, passive sensing using DCAF function involving collecting platforms (platforms may be referred to as collectors 102 but without RF exposure), and calculation of precision geolocation from TDOA measurement data and/or FDOA measurement, for example, resulting into a five meters (5 m) radius within 95% uncertainty.

The DCAF parallel processing unit 202 may be configured to solve the problem of traditional CAF methods that require the emitter to undergo a negligible position and velocity change during the dwell time because traditional DCAF functions may be configured to detect and track higher velocity and acceleration of emitter (for example for fighter jets or super/hypersonic targets) that requires longer dwell time as large as several hundreds of milliseconds. In an embodiment, the DCAF parallel processing unit 202 address both long dwell time and maneuverability requirements by partitioning the long dwells into short dwell segments where each segment may be treated as a narrow-band signal.

In an embodiment, the TDOA measurement data and/or FDOA measurement data between each pair of the RF collectors 102, the navigation data along with position and velocity of each RF collector 102 at a given time may be received by data fusion element 106, for example, sensor fusion engine 106 for estimating a trajectory of the emitter 101/target object 101. The trajectory of the emitter 101 movement may be displayed on the display device 108 that is communicatively coupled to the data fusion element 106. In an embodiment, data fusion element 106 may calculate emitter 101 trajectory and error bound estimate and sent to the TDOA/FDOA peaks search region update 208 for creating a bounding box search region for TDOA/FDOA peaks. The error bound estimate may be a covariance that may be provided with each target state estimate, which may be essentially a statistical confidence in the target trajectory and estimate of the region of uncertainty. At the initial stage, TDOA/FDOA peaks search region update 208 may use a default and initial search region. With the tracking of consecutive TDOA measurement data and/or FDOA measurement data may update the trajectory of the target object 101 and the bounding box search region. The process of calculating the TDOA measurement data and the FDOA measurement data, and estimating trajectory of the target object 101 and TDOA/FDOA peaks may be repeated consecutively in regular time intervals or particular time intervals, for example, 20 seconds, 40 seconds, etc. At each stage of TDOA/FDOA peaks measure, the bounding box search region may be updated using the confidence measure of the TDOA measurement data and/or FDOA measurement data, and a track candidate. The track candidate may be associated with increase in confidence of the estimation of the trajectory of the target object 101 and other target objects. For example, as the confidence of the trajectory estimation increases, the bounding box search region of the TDOA peak and/or FDOA peak search shrinks and results in a more precise TDOA/FDOA measurement. In an embodiment, the updated bounding box search region may be utilized in repeating time morphism calculation and subsequent DCAF functions for TDOA measurement data and/or FDOA measurement data, trajectory of the target object 101 including other target objects and TDOA peaks/FDOA peaks to update the display of the trajectory and the bounding box search region in loop.

Figure 8:
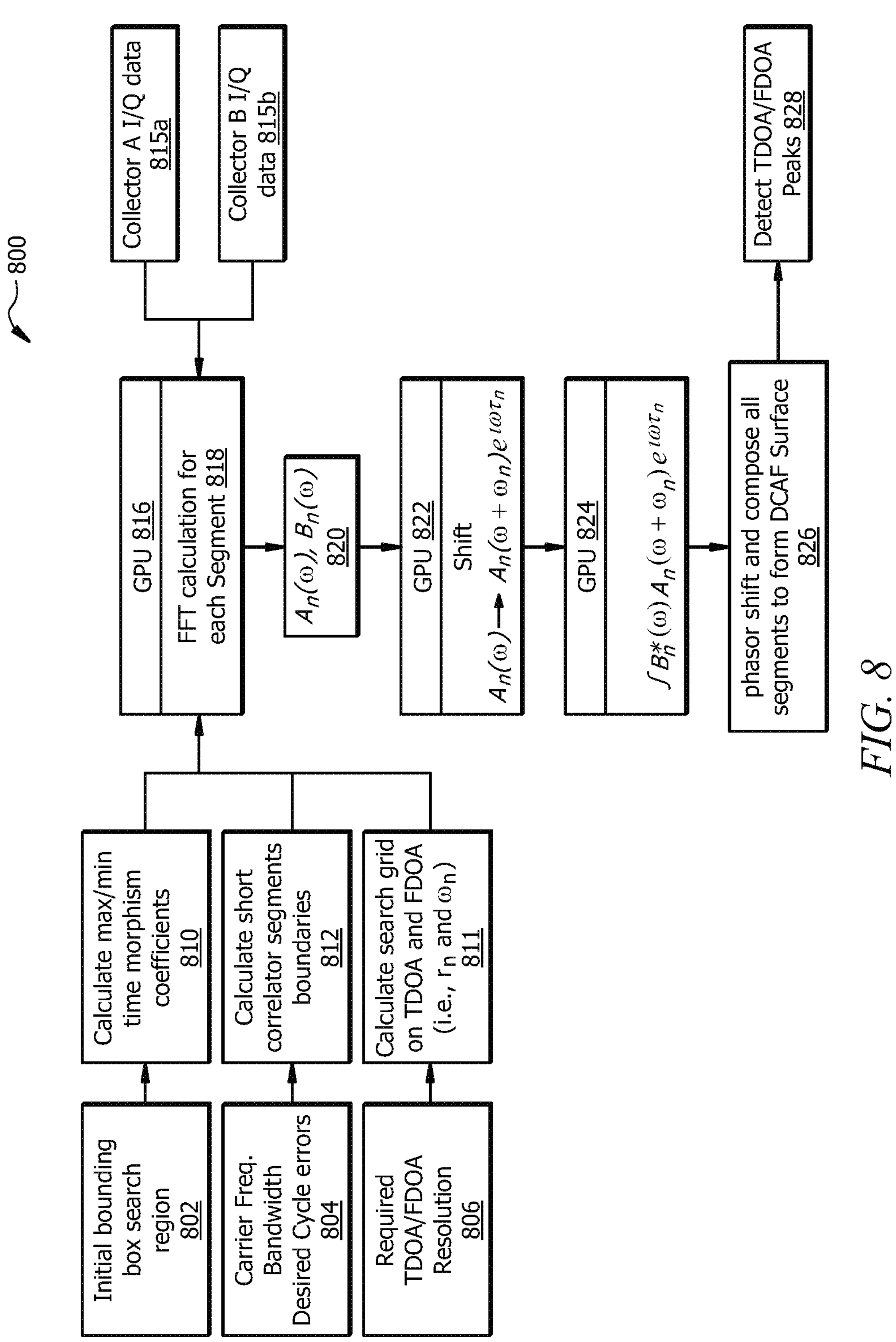
FIG. 8 illustrates DCAF processing steps using GPU parallel processing capability, according to particular embodiments.

FIG. 8 illustrates DCAF processing steps using graphics processing units (GPUs) parallel processing capability, according to particular embodiments. The DCAF computations may be carried out at multiple stages in parallel on multiple GPUs.

Figure 9:
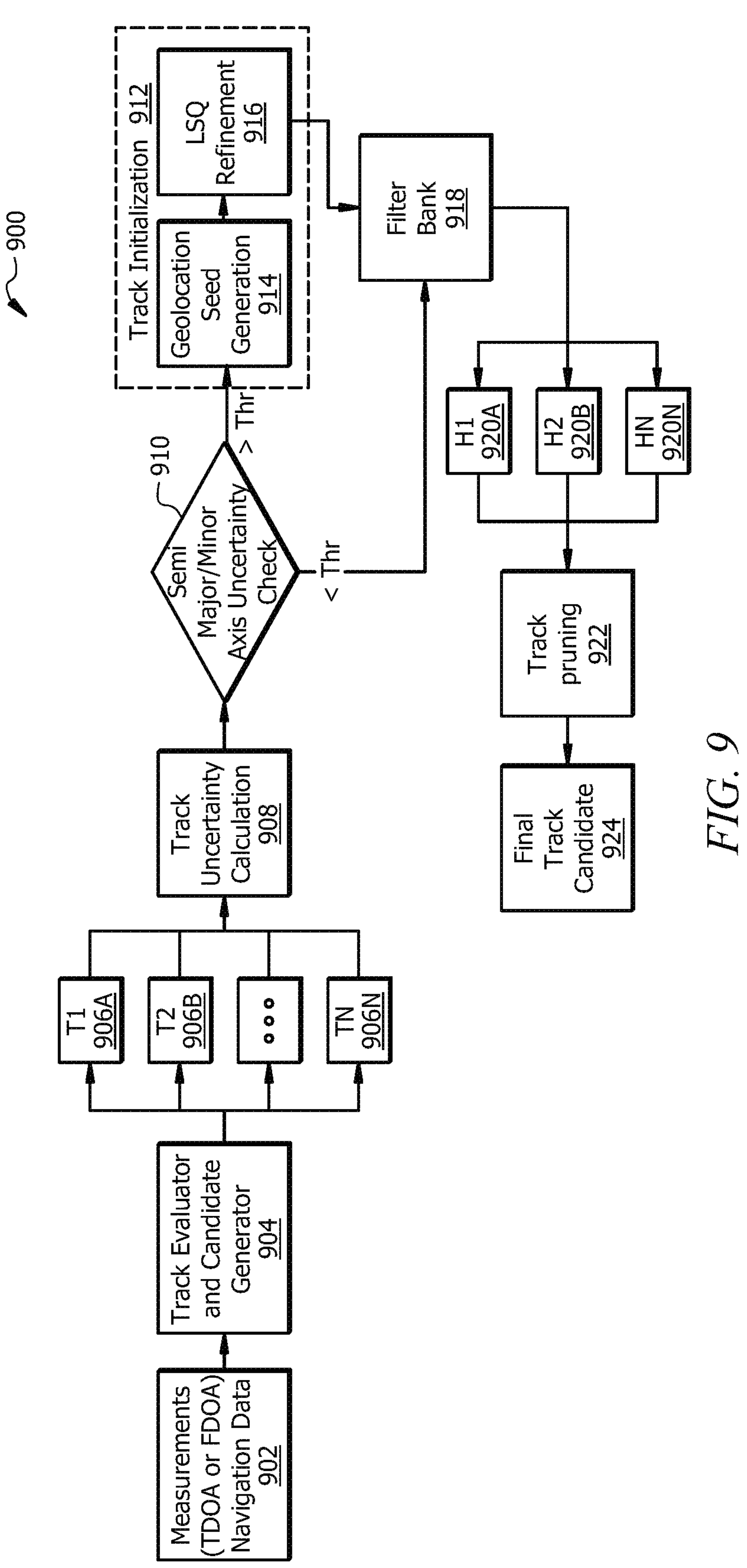
FIG. 9 illustrates an example of a data fusion element, according to particular embodiments.

FIG. 9 illustrates an example of a data fusion element 106 to generate track candidates for one or more target objects 101, according to particular embodiments. FIG. 9 illustrates flowchart for generating a track candidate to update bounding box search region at TDOA/FDOA search region update 208.

At block 902, the TDOA measurement data and/or FDOA measurement data, with navigation data of the RF collectors 102 may be received by the data fusion element 106. The data from DCAF processing functions may be sent to data fusion element 106 with conversion or without conversion to message data.

At block 904, a track evaluator and candidate generator, that may be configured in data fusion element 106, may evaluate TDOA measurement data and/or FDOA measurement data, navigation data, position data and velocity of all the target objects 101 to generate track candidates T1-906A, T2-906B . . . TN-906N.

At block 908, data fusion element 106 performs track uncertainty calculation 908 for each track candidates T1-TN.

At block 910, the track uncertainty calculation 908 may be used to perform semi major or minor axis uncertainty check. If the semi major or minor axis uncertainty check at block 910 is greater than or equal to a threshold value, track initialization 912 may be created. The track initialization 912 may create geolocation seed generation at 914 that may be associated with the initial estimation of the location of target object 101. From the geolocation see generation at 914 may be used to perform least square fitting (LSQ) refinement 916 on the track candidates. If the semi major or minor axis uncertainty check at block 910 is less than the threshold value, the track candidates T1-TN may be sent to filter bank 918.

From the filtering of track candidates T1-TN, hyperbole H1 (920A), H2 (920B), . . . , HN (920N) of each filtered track candidates may be created. AT block 922, track pruning may be performed on hyperboles H1-HN to identify the final track candidate 924. The data fusion element 106 may be configured to implement a 6DOF optimal reduced state estimation filter to estimate the position and velocity of each candidate track. The tracks with highest confidence measure may be declared as the final candidate. In particular embodiments, the candidates or objects that are tracked with highest confidence measure may be declared as the final track candidate at block 924.

Figure 10:
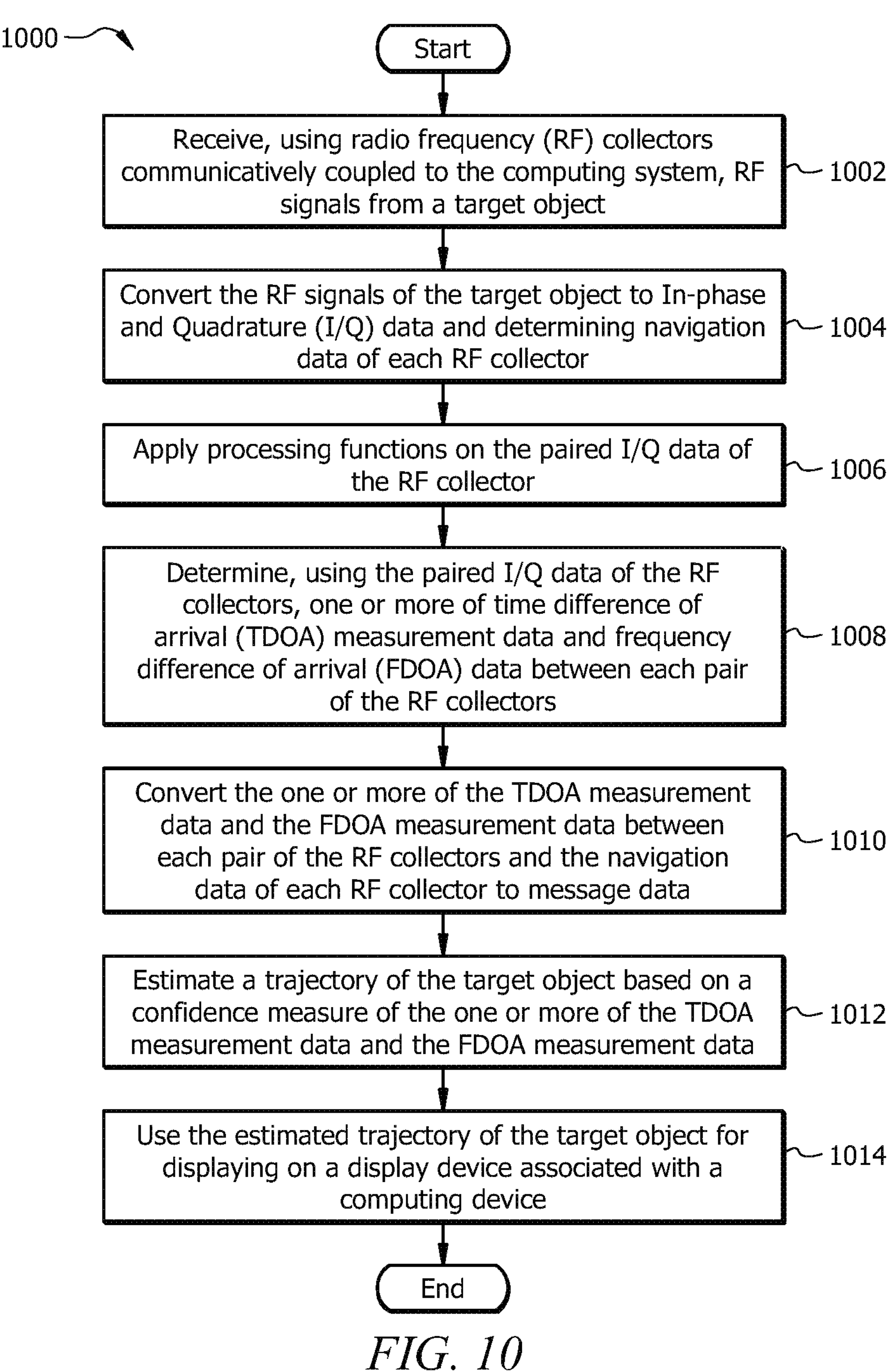
FIG. 10 is an example flowchart illustrating a method for tracking any maneuvering target objects according to particular embodiments.

FIG. 10 is an example flowchart illustrating a method for tracking any maneuvering target objects according to particular embodiments.

The process may be implemented by a network control system installed in a computing device. In an embodiment, the network control system may be a router. The process may be programmed to determine a plurality of access networks available for type of wireless service for running/implementing application data of the computing device and create a data flow architecture and service interface using the access networks for translation of data flow for wireless communication with a plurality of core networks.

The process begins at step 1002 to receive RF signals from a target object 101 using RF collectors 102 communicatively coupled to the computing system. In an embodiment, the RF signals from the target object are associated with one or more of a plurality of stationary communication RF signals, maneuvering communication RF signals, and a plurality of low signal to interference plus noise ratio (low-SINR) communication RF signals. In an embodiment, the RF signals from the target object 101 may be collected by one or more of at least three or more RF collectors 102. Each RF collector 102 may be associated with a GPS equipped devices to collect position data and velocity of each RF collector 102 at a given time from the navigation data. In an embodiment, the RF signals from the target object 101 may be received based on sensor or collection commands that may be issued periodically to capture the RF signals according to dwell start time and dwell duration, and each sensor or collection command specifies a UUID associated with a collection request.

At step 1004, the RF signals of the target object 101 may be converted to In-phase and Quadrature (I/Q) data. The conversion comprises removing baseband modulations from the RF signals to convert the RF signals to the I/Q data. From the GPS devices, navigation data of each RF collector may be determined and position data and velocity of each RF collector 102 may be determined from the navigation data. The I/Q data of each of the RF collectors 102 may be paired with the navigation data, position data and velocity.

At step 1006, processing functions are applied on the paired I/Q data, navigation data, position data and velocity of the RF collectors. The processing functions may include DCAF functions.

At step 1008, one or more of TDOA measurement data and FDOA measurement data may be determined from DCAF processing functions between each pair of the RF collectors 102 by using the paired I/Q data, navigation data, position data and velocity of the RF collectors.

At step 1010, the one or more of the TDOA measurement data and the FDOA measurement data between each pair of the RF collectors 102 and the navigation data of each RF collector 102 may be converted to message data.

At step 1012, the process estimates a trajectory of the target object 101 based on a confidence measure of the one or more of the TDOA measurement data and the FDOA measurement data. The trajectory may be used to create a bounding box search region to measure TDOA peaks and/or FDOA peaks.

At step 1014, the trajectory of the target object 101 may be used to display the trajectory on a display device 108 associated with a computing device. In an embodiment, the estimated trajectory of the target object 101 may be converted into a physical track in three dimensional space. The process further includes tracking consecutive TDOA measurements or consecutive FDOA measurements based on Mahalanobis distance. A track candidate corresponding to the consecutive TDOA measurements or consecutive FDOA measurements may be generated. The identification of the target object 101 may be determined from the track candidate. For each trajectory estimate of the track candidate that comprises a confidence increase in measuring the strong TDOA peaks or FDOA peaks that may be associated with shrinking the bounding box search region or TDOA/FDOA peaks search region. Thus, the bounding box search region may be updated based on the confidence increase in the estimation of the trajectory of not only the target object 101 but also the other target objects that are track candidates in increase of the confidence measure and narrowing down the bounding box search region. In an embodiment, track candidates may be associated with track coordinates determined from the navigation data and the track coordinates may be updated regularly at a defined rate. The confidence measure of the track candidates may also be updated regularly at the defined rate. The display device 108 may be updated with the updated trajectories of the track candidates and used further for consecutive update of the bounding box search region which also updates the setting the sensor or collection commands. In an embodiment, the updated trajectories and confidence measure of the track candidates may be used by the third-party entities for displaying on the associated display device.

Embodiments may include several applications, for example, enhanced signals intelligence (SIGINT) on interrupt service routine (ISR) platforms, and provides SIGINT capability to previously non-SIGINT platforms and installations. In particular, F35 were used in pre-existing platforms for DCAF that may be used in air force to enable tracking of airborne maneuvering targets. Example of applications may further include implementation of TDOA/FDOA SIGINT as a service to commercial/defense SIGINT organizations, for example, Hawkeye 360. The embodiment may be applied commercially for search/rescue missions to find RF receivers, and for security and law enforcement tracking applications. The application may also include implementation precision geolocation for guidance navigation and control (GNC), air and missile defense, maritime surveillance, locating unexpected sources of interference in telecommunications. In an embodiment, the application may be applied into system-of-systems offering with complete fire loop, for example, SIGINT Request→RF track→EO track→Precision strike.

Figure 11:
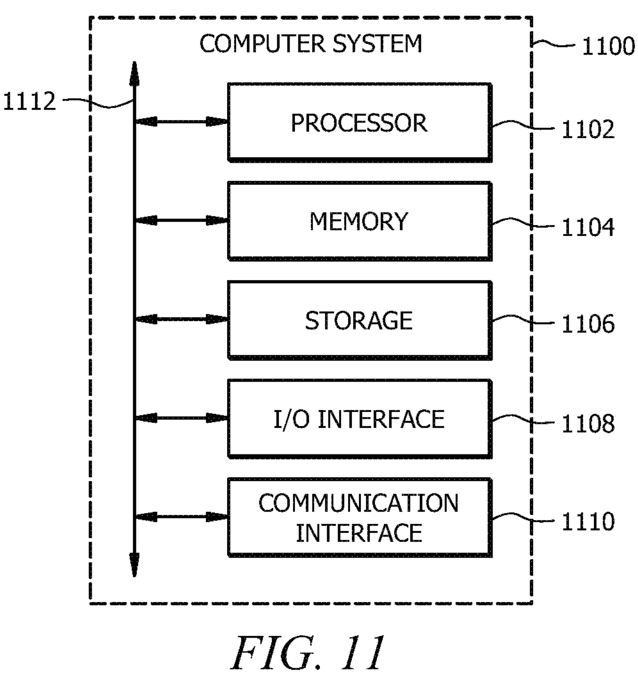
FIG. 11 illustrates an example computer system according to particular embodiments.

FIG. 11 illustrates an example computer system 1100. In particular embodiments, one or more computer systems 1100 perform one or more steps of one or more methods described or illustrated herein. In particular embodiments, one or more computer systems 1100 provide the functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. In some examples, memory 1104 may be integral to processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HyperTransport (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method implemented by a computing system, the method comprising:

receiving, using radio frequency (RF) collectors communicatively coupled to the computing system, RF signals from a target object;

converting the RF signals of the target object to In-phase and Quadrature (I/Q) data;

determining navigation data of each RF collector, wherein the I/Q data of each of the RF collectors are paired;

applying processing functions on the paired I/Q data of the RF collectors;

determining, using the paired I/Q data of the RF collectors, one or more of time difference of arrival (TDOA) measurement data and frequency difference of arrival (FDOA) measurement data between each pair of the RF collectors;

converting the one or more of the TDOA measurement data and the FDOA measurement data between each pair of the RF collectors and the navigation data of each RF collector to message data;

estimating a trajectory of the target object based on a confidence measure of the one or more of the TDOA measurement data and the FDOA measurement data; and using the estimated trajectory of the target object for displaying on a display device associated with a computing device.

2. The method of claim 1, wherein the RF signals from the target object are associated with one or more of a plurality of stationary communication RF signals, maneuvering communication RF signals, and a plurality of low signal to interference plus noise ratio (low-SINR) communication RF signals.

3. The method of claim 1, wherein the RF signals from the target object are collected by one or more of at least three or more RF collectors, wherein each RF collector is associated with a global positioning system (GPS) equipped devices to collect position data and velocity of each RF collector at a given time from the navigation data.

4. The method of claim 1, wherein the RF signals from the target object are received based on collection commands that are issued periodically to capture the RF signals according to dwell start time and dwell duration, each collection command specifying a universally unique identifier (UUID) associated with a collection request.

5. The method of claim 1, further comprising:

removing baseband modulations from the RF signals to convert the RF signals to the I/Q data.

6. The method of claim 1, further comprising:

tracking consecutive TDOA measurements or consecutive FDOA measurements based on Mahalanobis distance;

generating a track candidate corresponding to the consecutive TDOA measurements or consecutive FDOA measurements;

determining an identification of the target object from the track candidate; and using the identification of the target object to update the display device of the computing device.

7. The method of claim 6, further comprising:

creating a bounding box search region to measure TDOA peaks and FDOA peaks by using the trajectory of the target object; and updating the bounding box search region based on a confidence increase in the estimation of the trajectory.

8. A computing system, comprising:

a memory configured to store registration information of a computing device; and a hardware processor communicatively coupled to the memory, the hardware processor configured to execute:

receiving, using radio frequency (RF) collectors communicatively coupled to the computing system, RF signals from a target object;

converting the RF signals of the target object to In-phase and Quadrature (I/Q) data;

determining navigation data of each RF collector, wherein the I/Q data of each of the RF collectors are paired;

applying processing functions on the paired I/Q data of the RF collectors;

determining, using the paired I/Q data of the RF collectors, one or more of time difference of arrival (TDOA) measurement data and frequency difference of arrival (FDOA) measurement data between each pair of the RF collectors;

converting the one or more of the TDOA measurement data and the FDOA measurement data between each pair of the RF collectors and the navigation data of each RF collector to message data;

estimating a trajectory of the target object based on a confidence measure of the one or more of the TDOA measurement data and the FDOA measurement data; and using the estimated trajectory of the target object for displaying on a display device associated with a computing device.

9. The computing system of claim 8, wherein the RF signals from the target object are associated with one or more of a plurality of stationary communication RF signals, maneuvering communication RF signals, and a plurality of low signal to interference plus noise ratio (low-SINR) communication RF signals.

10. The computing system of claim 8, wherein the RF signals from the target object are collected by one or more of at least three or more RF collectors, wherein each RF collector is associated with a global positioning system (GPS) equipped devices to collect position data and velocity of each RF collector at a given time from the navigation data.

11. The computing system of claim 8, wherein the RF signals from the target object are received based on collection commands that are issued periodically to capture the RF signals according to dwell start time and dwell duration, each collection command specifying a universally unique identifier (UUID) associated with a collection request.

12. The computing system of claim 8, wherein the processor is further configured to execute removing baseband modulations from the RF signals to convert the RF signals to the I/Q data.

13. The computing system of claim 8, wherein the processor is further configured to execute:

tracking consecutive TDOA measurements or consecutive FDOA measurements based on Mahalanobis distance;

generating a track candidate corresponding to the consecutive TDOA measurements or consecutive FDOA measurements;

determining an identification of the target object from the track candidate; and using the identification of the target object to update the display device of the computing device.

14. The computing system of claim 13, wherein the processor is further configured to execute:

creating a bounding box search region to measure TDOA peaks and FDOA peaks by using the trajectory of the target object; and updating the bounding box search region based on a confidence increase in the estimation of the trajectory.

15. A non-transitory computer-readable medium storing instructions that, when executed by a processor of a computing system, causes the processor to execute:

receiving, using radio frequency (RF) collectors communicatively coupled to the computing system, RF signals from a target object;

converting the RF signals of the target object to In-phase and Quadrature (I/Q) data;

determining navigation data of each RF collector, wherein the I/Q data of each of the RF collectors are paired;

applying processing functions on the paired I/Q data of the RF collectors;

determining, using the paired I/Q data of the RF collectors, one or more of time difference of arrival (TDOA) measurement data and frequency difference of arrival (FDOA) measurement data between each pair of the RF collectors;

converting the one or more of the TDOA measurement data and the FDOA measurement data between each pair of the RF collectors and the navigation data of each RF collector to message data;

estimating a trajectory of the target object based on a confidence measure of the one or more of the TDOA measurement data and the FDOA measurement data; and using the estimated trajectory of the target object for displaying on a display device associated with a computing device.

16. The non-transitory computer-readable medium of claim 15, wherein the RF signals from the target object are associated with one or more of a plurality of stationary communication RF signals, maneuvering communication RF signals, and a plurality of low signal to interference plus noise ratio (low-SINR) communication RF signals.

17. The non-transitory computer-readable medium of claim 15, wherein the RF signals from the target object are collected by one or more of at least three or more RF collectors, wherein each RF collector is associated with a global positioning system (GPS) equipped devices to collect position data and velocity of each RF collector at a given time from the navigation data.

18. The non-transitory computer-readable medium of claim 15, wherein the RF signals from the target object are received based on collection commands that are issued periodically to capture the RF signals according to dwell start time and dwell duration, each collection command specifying a universally unique identifier (UUID) associated with a collection request.

19. The non-transitory computer-readable medium of claim 15, wherein the instructions when executed by the processor, further cause the processor to:

tracking consecutive TDOA measurements or consecutive FDOA measurements based on Mahalanobis distance;

generating a track candidate corresponding to the consecutive TDOA measurements or consecutive FDOA measurements;

determining an identification of the target object from the track candidate; and using the identification of the target object to update the display device of the computing device.

20. The non-transitory computer-readable medium of claim 19, wherein the instructions when executed by the processor, further cause the processor to:

creating a bounding box search region to measure TDOA peaks and FDOA peaks by using the trajectory of the target object; and updating the bounding box search region based on a confidence increase in the estimation of the trajectory.

* * * * *